US008715485B2

(12) United States Patent
Bonduelle et al.

(10) Patent No.: US 8,715,485 B2
(45) Date of Patent: May 6, 2014

(54) CATALYST BASED ON AN AMORPHOUS MATERIAL COMPRISING SILICON WITH A HIERARCHICAL AND ORGANIZED POROSITY, AND AN IMPROVED PROCESS FOR THE TREATMENT OF HYDROCARBON FEEDS

(75) Inventors: Audrey Bonduelle, Francheville (FR); Alexandra Chaumonnot, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 328 days.

(21) Appl. No.: 12/993,932

(22) PCT Filed: May 13, 2009

(86) PCT No.: PCT/FR2009/000557
§ 371 (c)(1),
(2), (4) Date: Nov. 22, 2010

(87) PCT Pub. No.: WO2009/144413
PCT Pub. Date: Dec. 3, 2009

(65) Prior Publication Data
US 2011/0073522 A1 Mar. 31, 2011

(30) Foreign Application Priority Data
May 28, 2008 (FR) .................................... 08 02952

(51) Int. Cl.
*C10G 47/00* (2006.01)
(52) U.S. Cl.
USPC ................. 208/58; 208/110; 208/46; 208/57; 208/59; 208/145
(58) Field of Classification Search
USPC ......................................................... 208/57
See application file for complete search history.

(56) References Cited

U.S. PATENT DOCUMENTS

| | | | |
|---|---|---|---|
| 5,902,564 A | 5/1999 | Lujano et al. | |
| 6,866,925 B1 | 3/2005 | Chane-Ching | |
| 2001/0031241 A1 | 10/2001 | Lacombe et al. | |
| 2006/0030477 A1* | 2/2006 | Chaumonnot et al. | 502/64 |
| 2006/0272981 A1* | 12/2006 | Gueret et al. | 208/57 |
| 2006/0292054 A1 | 12/2006 | Chaumonnot et al. | |
| 2009/0029847 A1 | 1/2009 | Euzen et al. | |
| 2009/0188834 A1* | 7/2009 | Euzen et al. | 208/111.3 |
| 2009/0232720 A1 | 9/2009 | Chaumonnot et al. | |
| 2010/0206775 A1* | 8/2010 | Beeckman et al. | 208/134 |

FOREIGN PATENT DOCUMENTS

| | | |
|---|---|---|
| EP | 1 108 678 | 6/2001 |
| EP | 1 627 852 | 2/2006 |
| EP | 1 627 853 | 2/2006 |
| WO | WO-01 32558 | 5/2001 |
| WO | WO-01 38223 | 5/2001 |
| WO | WO-2006 128989 | 12/2006 |

OTHER PUBLICATIONS

Christian Baerlocher, Lynne B. McCusker, David H. Olson, AEL—Imma, Atlas of Zeolite Framework Types (Sixth Edition), Elsevier Science B.V., Amsterdam, 2007, pp. 20-21, ISBN 9780444530646, 10.1016/B978-044453064-6/50191-2. (http://www.sciencedirect.com/science/article/pii/B9780444530646501912).*
Christian Baerlocher, Lynne B. McCusker, David H. Olson, CHA-R3_ m, Atlas of Zeolite Framework Types (Sixth Edition), Elsevier Science B.V., Amsterdam, 2007, pp. 96-97, ISBN 9780444530646, 10.1016/B978-044453064-6/50229-2. (http://www.sciencedirect.com/science/article/pii/B9780444530646502292).*
International Search Report of PCT/FR2009/000558 (Sep. 24, 2009).
Lee, H. I. et al., "Synthesis of highly stable mesoporous aluminosilicates from commercially available zeolites and their application to the pyrolysis of woody biomass," Catalysis Today, 2008, vol. 132, pp. 68-74.
Liu, Y. et al., "Steam-stable MSU-S Aluminosilicate Mesostructures Assembled from Zeolite ZSM-5 and Zeolite Beta Seeds," Angew. Chem. Int. Ed., 2001, vol. 40, No. 7, pp. 1255-1258.
On, D. T. et al., "An example of mesostructured zeolite material: UL-TS-1," Microporous and Mesoporous Materials, 2001, vol. 44-45, pp. 435-444.
Perez-Pariente, J. et al., "Organising disordered matter: strategies for ordering the network of mesoporous materials," C. R. Chimie, 2005, vol. 8, pp. 269-278.
Zhang, H. et al., "Preparation and Characterization of Beta/MCM-41 Composite Zeolite with a Stepwise-Distrubuted Pore Structured," Power Technology, 2008, vol. 183, pp. 73-78.
Zheng, J. et al., "Hydrothermally stable MCM-41 analogue with extensive embedded voids," Catalysis Today, 2004, vol. 93-95, pp. 529-534.

* cited by examiner

*Primary Examiner* — Prem C Singh
*Assistant Examiner* — Juan Valencia
(74) *Attorney, Agent, or Firm* — Millen, White, Zelano & Branigan, P.C.

(57) ABSTRACT

The present invention concerns a catalyst comprising at least one amorphous material comprising silicon with a hierarchical and organized porosity and at least one hydrodehydrogenating element selected from the group formed by elements from group VIB and/or group VIII of the periodic table of the elements. Said amorphous material comprising silicon with a hierarchical and organized porosity is constituted by at least two spherical elementary particles, each of said spherical particles comprising a matrix based on oxide of silicon, which is mesostructured, with a mesopore diameter in the range 1.5 to 30 nm and having amorphous and microporous walls with a thickness in the range 1.5 to 50 nm, said elementary spherical particles having a maximum diameter of 200 microns. The invention also concerns hydrocracking/hydroconversion and hydrotreatment processes employing said catalyst.

14 Claims, No Drawings

CATALYST BASED ON AN AMORPHOUS MATERIAL COMPRISING SILICON WITH A HIERARCHICAL AND ORGANIZED POROSITY, AND AN IMPROVED PROCESS FOR THE TREATMENT OF HYDROCARBON FEEDS

The present invention relates to the field of bifunctional catalysts characterized by hydrodehydrogenating and acidity properties. More particularly, it relates to a catalyst comprising at least one metallosilicate material and more precisely an amorphous aluminosilicate having a hierarchical and organized porosity in the domain of microporosity and mesoporosity and at least one hydrodehydrogenating element. It also pertains to the preparation of such a catalyst.

The invention also relates to hydrocracking, hydroconversion and hydrotreatment processes employing said catalyst.

In particular, the invention concerns the hydrocracking of hydrocarbon feeds containing, for example, aromatic compounds and/or olefinic compounds and/or naphthenic compounds and/or paraffinic compounds with the exception of feeds from the Fischer-Tropsch process, and possibly containing metals and/or nitrogen and/or oxygen and/or sulphur.

The aim of the hydrocracking process is essentially the production of middle distillates, i.e. cuts with an initial boiling point of at least 150° C. and an end point of up to just below the initial boiling point of residue, for example less than 340° C. or less than 370° C.

The invention also concerns the hydrotreatment of hydrocarbon feeds such as oil cuts, cuts from coal or hydrocarbons produced from natural gas. Said hydrocarbon feeds comprise nitrogen and/or sulphur and/or aromatic compounds and/or olefinic and/or naphthenic and/or paraffinic compounds, said feeds possibly containing metals and/or oxygen and/or sulphur.

The term "hydrotreatment" means hydrogenation, hydrodesulphurization, hydrodenitrogenation, hydrodeoxygenation, hydrodearomatization and hydrodemetallization reactions.

PRIOR ART

Hydrocracking heavy petroleum cuts is a very important refining process which can produce lighter fractions such as gasolines, jet fuels and light gas oils, which the refiner desires in order to adapt production to demand, from excess heavy feeds which are of low value. Certain hydrocracking processes can also produce a highly purified residue which can provide excellent base oils. In comparison with catalytic cracking, the importance of catalytic hydrocracking is to produce very good quality middle distillates, jet fuels and gas oils. In contrast, the gasoline produced has a much lower octane number than that from catalytic cracking.

Hydrocracking is a process which derives its flexibility from three principal elements, namely the operating conditions used, the types of catalysts employed and the fact that hydrocracking of hydrocarbon feeds may be carried out in one or two steps.

The catalysts used for hydrocracking are all bifunctional in type, combining an acid function with a hydrodehydrogenating function. The acid function is provided by supports with surface areas which are generally from 150 to 800 m$^2$/g with superficial acidity, such as halogenated aluminas (in particular chlorinated or fluorinated), combinations of boron and aluminium oxides, mesoporous amorphous aluminosilicates or zeolites. The hydrodehydrogenating function is provided either by one or more metals from group VIB of the periodic table of the elements, or by combination with at least one metal from group VIB of the periodic table of the elements with at least one group VIII metal.

The equilibrium between the two functions, acid and hydrodehydrogenating, is a parameter which governs the activity and selectivity of the catalyst. A weak acid function and a strong hydrodehydrogenating function produces catalysts with low activity, which generally operate at a high temperature (greater than or equal to 390° C.-400° C.), and at a low space velocity (the HSV, expressed as the volume of feed to be treated per unit volume of catalyst per hour, is generally less than or equal to 2), but they have very high selectivity for middle distillates. In contrast, a strong acid function and a weak hydrodehydrogenating function produce active catalysts which, however, have poor selectivity for middle distillates (jet fuels and gas oils).

One conventional type of hydrocracking catalyst is based on moderately acidic amorphous supports such as mesoporous aluminosilicates, for example. Such systems are used to produce high quality middle distillates and possibly base oils. Such catalysts are, for example, used in once-through processes. The disadvantage of such catalysts based on an amorphous mesoporous support is their low activity.

Catalysts comprising, for example, a Y zeolite with structure type FAU, or catalysts comprising, for example, a beta type zeolite (structure type BEA) have a higher catalytic activity than that of amorphous mesoporous aluminosilicates, but have selectivities for middle distillates (jet fuels and gas oils) which are lower.

One of the scientific challenges of recent years has consisted of developing novel aluminosilicate supports which may or may not be crystalline, which could present an acceptable compromise between catalytic activity and selectivity for middle distillates and which could lie half way between a zeolitic type behaviour and amorphous mesoporous aluminosilicate type behaviour.

Further, the proportion of compounds denoted as "heavy" in unrefined feeds to be treated is increasing constantly, and so the development of catalysts having textural properties which are adapted to these new feeds also represents a major challenge.

In this quest for novel aluminosilicate materials, materials termed "mesostructured", discovered at the beginning of the 1990s, represent a seductive alternative (G J de A A Soler-Illia, C Sanchez, B Lebeau, J Patarin, Chem Rev 2002, 102, 4093). In particular, the development of syntheses using "mild chemistry" methods has led to the production of amorphous mesostructured materials with a controlled pore morphology and size. Such mesostructured materials are generated thereby at low temperature by the co-existence in aqueous solution or in polar solvents of inorganic precursors with templates, generally molecular or supramolecular, ionic or neutral surfactants. Controlling the electrostatic interactions or hydrogen bonding between the inorganic precursors and the template jointly with hydrolysis/condensation reactions of the inorganic precursor leads to a cooperative organization of the organic and inorganic phases, generating micellar aggregates of surfactants of controlled uniform size in an inorganic matrix. This cooperative self-organization phenomenon governed, inter alia, by the concentration of the template, may be induced by progressive evaporation of a solution of reagents in which the concentration of the template is lower than the critical micellar concentration, which leads, for example, to the formation of a mesostructured powder after the solution is atomized (aerosol technique). The pores are then freed by eliminating the surfactant, this being carried out conventionally by chemical extraction processes or by heat treatment. Several classes of mesostructured materials have been developed which are a function of the natures of the inorganic precursors and the template employed as well as the operating conditions imposed. As an example, the M41S class initially developed by Mobil (J S Beck, J C Vartuli, W J Roth, M E Leonowicz, C T Kresge, K D Schmitt, C T-W Chu, D H Olson, E W Sheppard, S B McCullen, J B Higgins, J L Schlenker, J Am Chem Soc, 1992, 114, 27, 10834) constituted by mesoporous materials obtained using ionic surfactants such as quaternary ammonium salts, having a generally hexagonal, cubic or lamellar structure, with pores of uniform size in the range 1.5 to 10 nm and amorphous walls with a thickness of the order of 1 to 2 nm, has been widely studied. Similarly, the use of block copolymer type amphiphilic macromolecule templates has led to the production of the SBA family of materials, these solids being characterized by a generally hexagonal, cubic or lamellar structure, with uniformly sized pores in the range 4 to 50 nm and amorphous walls with a thickness in the range 3 to 7 nm.

However, it has been shown that although they have particularly interesting textural and structural properties (in particular for the processing of heavy feeds), the mesostructured aluminosilicate materials obtained developed a catalytic activity which was almost indistinguishable from that of their homologues with a non-organized porosity (D Zaho, J Feng, Q Hua, N Melosh, G H Fredrickson, B F Chmelke, G D Stucky, Science, 1998, 279, 548; Y-H Yue, A Gédéon, J L Bonardet, J B d'Espinose, N Melosh, J Fraissard, Stud Surf Sci Catal 2000, 129, 209). A great many studies were thus undertaken with the aim of producing materials having a zeolitic type microporosity and a mesostructured porosity in order to simultaneously benefit from the catalytic properties of zeolites and the catalytic and above all the textural properties of the organized mesoporous phase.

A large number of synthesis techniques which can produce materials with this bi-porosity have been recorded in the open literature (U.S. Pat. No. 6,669,924; Z Zhang, Y Han, F Xiao, S Qiu, L Zhu, R Wang, Y Yu, Z Zhang, B Zou, Y Wang, H Sun, D Zhao, Y Wei, J Am Chem. Soc, 2001, 123, 5014; A Karlsson, M Stöcker, R Schmidt, Micropor Mesopor Mater 1999, 27, 181; P Prokesova, S Mintova, J Cejka, T Bein, Micropor Mesopor Mater, 2003, 64, 165; D T On, S Kaliaguine, Angew Chem Int Ed, 2002, 41, 1036). From an experimental point of view, in contrast to the "aerosol" technique cited above, aluminosilicate materials with a hierarchical porosity as defined are not obtained by progressive concentration of inorganic precursors and template(s) in the solution in which they are present, but are obtained conventionally by direct precipitation from an aqueous solution or from polar solvents by adjusting the value of the critical micellar concentration of the template. Further, synthesis of such materials obtained by precipitation necessitates a maturation step in an autoclave as well as a step for filtering the suspension generated. The elementary particles normally obtained are not regular in shape and are generally characterized by a size that is generally between 200 and 500 nm, sometimes more.

Thus, one of the aims of the invention is to propose a catalyst having improved performances, in particular in hydrocracking and hydrotreatment.

SUMMARY OF THE INVENTION

The invention concerns a catalyst comprising at least one amorphous material comprising silicon with a hierarchical and organized porosity and at least one hydrodehydrogenating element selected from the group formed by elements from group VIB and/or group VIII of the periodic table of the elements. Said amorphous material comprising silicon with a hierarchical and organized porosity is constituted by at least two elementary spherical particles, each of said particles comprising a matrix based on oxide of silicon, which is mesostructured, having a mesopore diameter in the range 1.5 to 30 nm and having amorphous and microporous walls with a thickness in the range 1.5 to 50 nm, said elementary spherical particles having a maximum diameter of 200 microns. The amorphous walls of said matrix based on oxide of silicon are entirely constituted by proto-zeolitic entities at the origin of the microporosity. They are species prepared from reagents used for the synthesis of zeolites or related solids, the preparation of said species not being continued to the stage at which crystalline zeolites are formed. Thus, formulations resulting in any zeolite or related solid developing properties of acidity may be used. The result is that said matrix based on oxide of silicon further comprises at least one element X, the chemical nature of X being a function of the composition of said formulations used. Advantageously, X is the element aluminium. The catalyst also optionally comprises at least one doping element in a controlled quantity selected from phosphorus, boron and silicon, optionally at least one element from group VB of the periodic table of the elements, preferably niobium, and optionally an element from group VIIA, preferably fluorine. The present invention also concerns the preparation of the catalyst of the invention. Further, the present invention concerns hydrocracking, hydroconversion and hydrotreatment processes employing this catalyst.

ADVANTAGE OF THE INVENTION

Said amorphous material comprising silicon with a hierarchical and organized porosity constituted by a mesostructured inorganic matrix based on oxide of silicon with amorphous and microporous walls simultaneously has the structural and textural properties of materials based on oxide of silicon and, more precisely, mesostructured aluminosilicate materials, as well as better acid-basic properties than those of prior art amorphous aluminosilicate materials which are free of precursors of proto-zeolitic entities, prepared using synthesis protocols which are well known to the skilled person using inorganic precursors of silica and alumina. Further, the presence in one and the same spherical particle of micrometric or even nanometric sized mesopores organized into a microporous and amorphous inorganic matrix results in enhanced access by the reagents and reaction products to microporous sites during use of the material as a constituent element of the catalyst of the invention in hydrocracking, hydroconversion and hydrotreatment processes. Further, the greater proximity of the acidic and hydrogenating sites resulting from dispersing the metallic phase directly on the inorganic matrix prevents molecules which have already been cracked on a first acid site from being cracked again. Further, the material of the invention is constituted by elementary spherical particles, the maximum diameter of said particles being 200 μm, preferably less than 100 μm, advantageously in the range 50 nm to 20 μm, highly advantageously 50 nm to 10 μm and still more advantageously in the range 50 nm to 3 μm. The limited size of these particles as well as their homogeneous spherical shape means that the reagents and reaction products can diffuse better during use of the material as a constituent element of the catalyst of the invention in hydrocracking, hydroconversion and hydrotreatment processes compared with known prior art catalysts.

The set of properties of the amorphous material comprising silicon with a hierarchical and organized porosity thus induces specific catalytic properties in the catalyst of the invention comprising said material during its use in hydrocracking, hydroconversion and hydrotreatment processes. The research work carried out by the Applicant on these innovative solids and on active hydrodehydrogenating phases has led to the discovery that a catalyst for hydrocracking of hydrocarbon feeds comprising at least said amorphous material comprising silicon with a hierarchical and organized porosity, at least one hydrodehydrogenating metal, can produce activities (i.e. levels of conversion) which are high compared with those generated by conventional catalysts based on amorphous aluminosilicates with a non-organized porosity and selectivities for middle distillates (jet fuel and gas oil) which are higher than with known prior art zeolitic catalysts.

Characterization Techniques

The catalyst and the support formed from said amorphous material comprising silicon with a hierarchical and organized porosity of the invention is characterized using several analytical techniques, in particular by small angle X ray diffraction (small angle XRD), by nitrogen volumetry (BET), by transmission electron microscopy (TEM) optionally coupled with energy selection X ray spectrometry (EDX), by Castaing microprobe, by electronic microprobe and by X ray fluorescence (XF) or atomic absorption (AA).

Nitrogen volumetry, which corresponds to the physical adsorption of molecules of nitrogen into the pores of a material via a gradual increase in pressure at constant temperature, provides information regarding textural characteristics (mesopore diameter, type of porosity, specific surface area) which are peculiar to the catalyst of the invention. In particular, it provides access to the total microporous and mesoporous volume of the support for the catalyst of the invention. The shape of the nitrogen adsorption isotherm and of the hysteresis loop can provide information regarding the presence of microporosity linked to the proto-zeolitic entities constituting the amorphous walls of the matrix of each of the spherical particles of the support for the catalyst of the invention and on the nature of the mesoporosity. In the discussion below, the given diameter of the mesopores $\phi$, of the support for the catalyst of the invention corresponds to the mean nitrogen desorption diameter, defined as a diameter at which all pores smaller than that diameter constitute 50% of the pore volume ($V_p$) measured on the desorption branch of the nitrogen isotherm. A quantitative analysis of the microporosity of the support for the catalyst of the invention is carried out using the "t" method (Lippens-de Boer method, 1965) or the "$\alpha_s$" method (method proposed by Sing) which corresponds to transforms of the initial adsorption isotherm as described in the work entitled "Adsorption by powders and porous solids. Principles, methodology and applications" by F Rouqerol, J Rouquerol and K Sing, Academic Press, 1999. In particular, these methods provide access to the value of the characteristic microporous volume of the microporosity of the support for the catalyst of the invention as well as to the specific surface area of the sample. The reference solid used is a LiChrospher Si-1000 silica (M Jaroniec, M Kruck, J P Olivier, Langmuir, 1999, 15, 1410). Concerning the mesostructured matrix of the support for the catalyst of the invention, the difference between the value of the diameter of the mesopores $\phi$ and the correlation distance between mesopores, d, defined by small angle XRD as described below, provides access to the quantity e, where e=d−$\phi$, and is characteristic of the thickness of the amorphous walls of the mesostructured matrix of the support for the catalyst of the invention. Similarly, the curve $V_{ads}$(ml/g)=f($\alpha_s$), obtained using the $\alpha_s$ method cited above, is characteristic of the presence of microporosity in the support for the catalyst and produces a value for the microporous volume which is in the range 0.01 to 0.4 ml/g. The determination of the total microporous and mesoporous volume and of the microporous volume as described above results in a value for the mesoporous volume of the support for the catalyst of the invention which is in the range 0.01 to 1 ml/g.

Small angle X ray diffraction (values for the angle 2θ in the range 0.5° to 3°) can be used to characterize the nanometric scale periodicity generated by the organized mesoporosity of the catalyst of the invention. In the disclosure below, powder X ray analysis was carried out using a diffractometer operating in reflection equipped with a back monochromator using the copper radiation line (wavelength 1.5406 Å). The peaks normally observed on diffractograms corresponding to a given value for the angle 2θ are associated with interplanar spacings $d_{hkl}$ which are characteristic of the structural symmetry of the material, (hkl being the Miller indices of the reciprocal lattice) by the Bragg relationship: $2d_{hkl}*\sin(\theta)=n*\lambda$. This indexation then allows the lattice parameters (a, b, c) of the framework to be determined directly, the value of these parameters being a function of the hexagonal, cubic or vermicular structure obtained and a characteristic of the periodic organization, i.e. homogeneous and regular, of the mesopores of the catalyst of the invention.

Transmission electron microscope analysis (TEM) is a technique which is also widely employed to characterize the mesostructuring of the catalyst of the invention. This allows an image of the solid being studied to be formed, the contrasts observed being characteristic of the structural organization, texture and morphology of the particles observed, the resolution of the technique reaching a maximum of 0.2 nm. Image analysis also provides access to the parameters d and $\phi$, characteristic of the catalyst of the invention as defined above.

The distribution and localization of the elements constituting the hydrogenating phase may be determined using techniques such as the Castaing microprobe (distribution profile of various elements), transmission electron microscopy coupled with X ray analysis of the catalyst components (EDX), or by establishing a distribution map of the elements present in the catalyst by electron microprobe. Those techniques can demonstrate the presence of these exogenic elements added after synthesis of the amorphous material with a hierarchical and organized porosity comprising silicon and constituting the catalyst of the invention. The distribution and localization of the elements from group VIB such as molybdenum or tungsten, from group VIII such as iron, cobalt, nickel, platinum or palladium, from group VB such as niobium, group VIIA such as fluorine, may be determined using these techniques. Similarly, the distribution and localization of boron, silicon and phosphorus may be determined using these techniques.

The overall composition of the catalyst of the invention may be determined by X ray fluorescence (XF) on said catalyst in a powdered state or by atomic absorption (AA) after acid attack of said catalyst.

DETAILED DISCLOSURE OF THE INVENTION

More precisely, the invention pertains to a catalyst comprising:
at least one support formed by at least one amorphous material comprising silicon with a hierarchical and organized porosity constituted by at least two elementary spherical particles, each of said spherical particles comprising a matrix based on oxide of silicon, which is mesostructured, with a mesopore diameter in the range 1.5 to 30 nm and having amorphous and macroporous walls with a thickness in the range 1.5 to 50 nm, said elementary spherical particles having a maximum diameter of 200 microns:

at least one active phase containing at least one hydrodehydrogenating element from group VIB and/or group VIII of the periodic table of the elements.

According to the invention, the element from group VIB is advantageously present in an amount by weight of metal oxide in the range 0.1% to 40%, preferably in the range 1.5% to 35% and more preferably in the range 3% to 35%, the percentages being expressed as a % by weight with respect to the total mass of catalyst and the group VIII element advantageously being present in an amount by weight of metal in the range 0.1% to 25%, preferably in the range 0.1% to 20% and more preferably in the range 0.1% to 15%; said material with a hierarchical porosity is advantageously present in an amount by weight in the range 20% to 99.9%, preferably in the range 30% to 99.9% and more preferably in the range 40% to 99.9%.

The catalyst of the invention comprises:
- optionally, at least one doping element selected from the group constituted by silicon (in addition to the silicon contained in said material with a hierarchical porosity present in the catalyst of the invention), boron and phosphorus, present in an amount by weight in the range 0 to 20%, preferably in the range 0.1% to 15%, more preferably in the range 0.1% to 10% and still more preferably in the range 0.2% to 5%;
- optionally, at least one element from group VB, preferably niobium, present in an amount by weight in the range 0 to 60%, preferably in the range 0.1% to 50%, and more preferably in the range 0.1% to 40%;
- optionally, at least one element from group VIIA, preferably fluorine, present in an amount by weight in the range 0 to 20%, preferably in the range 0.1% to 15%, and more preferably in the range 0.1% to 10%;
- optionally, a binder such as silica, alumina, clays, titanium oxide, boron oxide or zirconia or any mixture of said binders. Preferred binders are silica and alumina and more preferably alumina. The amount by weight of binder on the catalyst is in the range 0 to 30%, preferably in the range 0 to 20%. The catalyst of the invention is preferably free of binder.

In accordance with a first embodiment of the catalyst of the invention, the hydrodehydrogenating element of said active phase comprised in said catalyst is an element selected from the group formed by elements from group VIB and is preferably selected from molybdenum and tungsten.

In accordance with a preferred mode of said first embodiment of the catalyst of the invention, the hydrodehydrogenating element of said active phase comprised in said catalyst is an element selected from the group formed by elements from group VIB of the periodic table of the elements, namely molybdenum.

In accordance with another preferred mode of said first embodiment of the catalyst of the invention, the hydrodehydrogenating element selected from the group formed by elements from group VIB of the periodic table of the elements is tungsten.

In accordance with a second embodiment of said catalyst of the invention, the hydrodehydrogenating element of said active phase comprised in said catalyst is an element selected from the group formed by elements from group VIII and is preferably selected from iron, cobalt, nickel, ruthenium, rhodium, palladium, osmium, iridium and platinum, used alone or as a mixture, more preferably selected from iron, cobalt, nickel, platinum, palladium and ruthenium, used alone or as a mixture, and still more preferably selected from cobalt, nickel and platinum, used alone or as a mixture.

According to a preferred mode of said second embodiment of the catalyst of the invention, the hydrodehydrogenating element selected from the group formed by elements from group VIII of the periodic table of the elements is cobalt.

According to another preferred mode of said second embodiment of the catalyst of the invention, the hydrodehydrogenating element selected from the group formed by elements from group VIII of the periodic table of the elements is nickel.

According to yet another preferred mode of said second embodiment of the catalyst of the invention, the hydrodehydrogenating element selected from the group formed by elements from group VIII of the periodic table of the elements is platinum.

According to a third embodiment of the catalyst of the invention, said active phase included in said catalyst is formed by at least one element from group VIB and at least one element from group VIII.

According to said third embodiment of the catalyst of the invention, and in an advantageous manner, the active phase uses the following combinations of metals: nickel-molybdenum, cobalt-molybdenum, iron-molybdenum, iron-tungsten, nickel-tungsten, cobalt-tungsten, platinum-palladium, preferably the following combinations: nickel-molybdenum, cobalt-molybdenum, cobalt-tungsten, nickel-tungsten and still more preferably the following combinations: nickel-molybdenum and nickel-tungsten.

It is also possible to use combinations of three metals as the active phase, for example nickel-cobalt-molybdenum, nickel-molybdenum-tungsten, nickel-cobalt-tungsten, etc. Advantageously, the following combinations of metals are used: nickel-niobium-molybdenum, cobalt-niobium-molybdenum, iron-niobium-molybdenum, nickel-niobium-tungsten, cobalt-niobium-tungsten, iron-niobium-tungsten and preferably nickel-niobium-molybdenum and cobalt-niobium-molybdenum combinations.

It is also possible to use combinations of four metals as the active phase, for example nickel-cobalt-niobium-molybdenum. It is also possible to use combinations containing a noble metal, such as ruthenium-niobium-molybdenum, or even ruthenium-nickel-niobium-molybdenum.

In accordance with the invention, said amorphous material comprising silicon with a hierarchical and organized porosity is constituted by at least two elementary spherical particles, each of said particles comprising a matrix based on oxide of silicon, which is mesostructured, with a mesopore diameter in the range 1.5 to 30 nm and having amorphous and microporous walls with a thickness in the range 1.5 to 50 nm, said elementary spherical particles having a maximum diameter of 200 microns.

The material present in the catalyst of the invention is a material with a hierarchical porosity in the domains of microporosity and mesoporosity and organized porosity in the domain of mesoporosity. The term "material with a hierarchical and organized porosity" as used in the context of the present invention means a material having a double porosity on the scale of each of said spherical particles: mesoporosity, i.e. the presence of pores organized on the mesopore scale, having a uniform diameter in the range 1.5 to 30 nm, preferably in the range 4 to 30 nm, and more preferably in the range 5 to 30 nm, distributed homogeneously and in a regular manner in each of said particles (mesostructuring), and a microporosity induced by the amorphous walls, the characteristics of this microporosity being a function of the protozeolitic entities constituting the amorphous walls of the matrix of each of the spherical particles of the material with a hierarchical and organized porosity present in the catalyst of the invention. The microporosity is characterized by the presence of micropores within said amorphous walls with a diameter of less than 1.5 nm. The constituent support of the catalyst of the invention also has intra- and/or inter-particular textural macroporosity(ies). It should be noted that porosity of a microporous nature may also result from interleaving a surfactant used during the preparation of the material with a hierarchical and organized porosity present in the catalyst of the invention with the inorganic wall at the organic-inorganic interface developed during meso structuring of the inorganic component of said material with a hierarchical and organized porosity present in the catalyst of the invention. Advantageously, none of the spherical particles constituting the material present in the catalyst of the invention has any macropores.

The matrix based on oxide of silicon forming each of the spherical particles of the material with a hierarchical and organized porosity present in the catalyst of the invention advantageously has amorphous walls constituted entirely by proto-zeolitic entities, which are at the origin of the microporosity present in each of the spherical particles of the material present in the catalyst of the invention. The proto-zeolitic entities are species prepared from reagents used for the synthesis of zeolites or related solids, the preparation of said species not having been carried out to the stage at which crystalline zeolites and corresponding related solids are formed. This means that said proto-zeolitic entities, which are small in size, are not detected when they are characterized by large angle X ray diffraction. More precisely and in accordance with the invention, the proto-zeolitic entities integrally and homogeneously constituting the amorphous microporous walls of the matrix of each of the spherical particles of the material present in the catalyst of the invention are species resulting from bringing at least one template, at least one silicic precursor and at least one precursor of at least one element X together under varying time and temperature conditions in order to produce a clear solution, said species possibly serving as a primer for the synthesis of any zeolite or related solid developing acidity properties, in particular but not exhaustively those listed in the "Atlas of Zeolite Framework Types", $5^{th}$ revised Edition, 2001, Ch Baerlocher, W M Meier, D H Olson. As a result, said matrix based on oxide of silicon comprises, in addition, at least one element X, the chemical nature of X being a function of the chemical nature of said proto-zeolitic entities employed and which can be one of the following elements, listed in a non-exhaustive manner: aluminium, iron, germanium, boron or titanium. Advantageously, X is the element aluminium. In this case, the matrix of the material present in the catalyst of the invention is an amorphous aluminosilicate, a precursor of a crystalline aluminosilicate material. This amorphous aluminosilicate has a molar ratio Si/Al equal to that of the solution of silicic and alumina precursors resulting in the formation of the proto-zeolitic entities integrally constituting the amorphous and microporous walls of the matrix.

The term "zeolite or related solid well known to the skilled person" means the set of crystalline microporous oxide solids the constituent atomic elements of the inorganic framework of which has IV coordination. By definition, the denomination "zeolite" is attributed to said silicic or aluminosilicic microporous oxide solids. Similarly, the denomination "related solid" concerns the set of crystalline microporous oxide solids the constituent atomic elements of the inorganic framework of which has IV coordination, said microporous silicic or aluminosilicic oxide solids being excluded. Any zeolite or related solid having at least one trivalent atomic element at the origin of the presence of a negative charge on said framework and which may be compensated for by a positive charge of a protonic nature may develop acidity properties. In particular, aluminosilicate type zeolites and related solids of the silicoaluminophosphate type develop such properties.

The proto-zeolitic entities integrally constituting the amorphous walls of the matrix of each of the particles of the material present in the catalyst of the invention and at the origin of the microporosity thereof are preferably species for initiation of at least one zeolite selected from the following aluminosilicates: ZSM-5, ZSM-48, ZSM-22, ZSM-23, ZBM-30, EU-1, EU-2, EU-11, beta, zeolite A, Y, USY, VUSY, SDUSY, mordenite, NU-87, NU-88, NU-86, NU-85, IM-5, IM-12, IZM-2 and ferrierite and/or at least one related solid selected from silicoaluminophosphates SAPO-11 and SAPO-34. Most preferably, the proto-zeolitic entities integrally constituting the amorphous and microporous walls of the matrix of each of the particles of material present in the catalyst of the invention are species which can initiate at least one zeolite selected from aluminosilicates with structure type MFI, BEA, FAU and LTA and/or at least one related solid selected from silicoaluminophosphates with structure type AEL, CHA.

The matrix based on oxide of silicon included in each of the spherical particles constituting the material present in the catalyst of the invention is mesostructured: it has mesopores with a uniform diameter in the range 1.5 to 30 nm and preferably in the range 4 to 30 nm, and more preferably in the range 5 to 30 nm, distributed in a homogeneous and regular manner in each of the spherical particles. The material located between the mesopores of each of said spherical particles is microporous and integrally amorphous and forms walls or partitions the thickness of which is in the range 1 to 50 nm, preferably in the range 2.5 to 30 nm, and more preferably in the range 4 to 30 nm. The thickness of the walls corresponds to the distance separating a first mesopore from a second mesopore, the second mesopore being the pore closest to said first mesopore. Organisation of the mesoporosity described above results in structuration of the matrix based on oxide of silicon, which may be hexagonal, vermicular or cubic, preferably vermicular, depending on the nature of the surfactant used to produce the material present in the catalyst of the invention. The DRX analysis with small angles allows the calculation of the correlation distance d between the organized mesopores of said material: the correlation distance d between the organized mesopores of said material is comprises between 6 and 50 nm, preferably between 8 and 30 nm and more preferably between 9 and 25 nm.

The $^{27}Al$ RMN MAS analysis of the solid, in the case wherein element X is aluminium leads to $^{27}Al$ RMN spectrum of the material present in the catalyst according to the invention, said catalyst being characterized by the presence of 2 or 3 peaks respectively associated to the presence of aluminium atoms in IV and VI coordination or by the presence of aluminium atoms in IV, V and VI coordination. The chemical shifts of said atoms in IV, V and VI coordination are respectively of about 50, 30 and 0 ppm. the quantitative determination of different aluminium atoms shows that the aluminic species in V and/or VI coordination represents at least 10% molar, preferably at least 15% molar and more preferably at least 20% molar of the whole aluminic species.

Moreover, the material present in the catalyst according to the invention and the catalyst according to the invention do not lead to any signal when analysed by Infrared Fourier Transform (IRTF). Particularly, they do not display the visible band by IRTF between 550 and 600 cm$^{-1}$ which is characteristic of pentasil species of zeolitic entity MFI type.

In accordance with the invention, the maximum diameter of said elementary spherical particles constituting the material with hierarchical and organized porosity present in the catalyst of the invention is 200 µm, preferably less than 100 µm, advantageously in the range 50 nm to 20 µm, highly advantageously in the range 50 nm to 10 µm and more preferably in the range 50 nm to 3 µm. More precisely, they are present in the material present in the catalyst of the invention in the form of aggregates.

The material with a hierarchical and organized porosity present in the catalyst of the invention advantageously has a specific surface area in the range 100 to 1100 m$^2$/g, highly advantageously in the range 200 to 1000 m$^2$/g.

The material with a hierarchical and organized porosity present in the catalyst of the invention advantageously has a mesoporous volume, measured by nitrogen volumetry, in the range 0.01 to 1 ml/g, preferably in the range 0.01 to 0.8 ml/g and a microporous volume, measured by nitrogen volumetry, in the range 0.01 to 0.4 ml/g.

The catalyst of the invention advantageously has a specific surface area in the range 70 to 1000 m$^2$/g, highly advantageously in the range 80 to 800 m$^2$/g.

The catalyst of the invention advantageously has a mean mesoporous diameter in the range 1.5 to 30 nm, highly advantageously in the range 3 to 15 nm.

The present invention also pertains to the preparation of the catalyst of the invention.

The material with a hierarchical and organized porosity comprising silicon constituting the catalyst of the invention is obtained using a preparation process which comprises: a) preparing a clear solution containing precursor elements of the proto-zeolitic entities, namely at least one template, at least one silicic precursor and at least one precursor of at least one element X, X advantageously being aluminium; b) mixing, in solution, at least one surfactant and at least said clear solution obtained in a) such that the ratio of the volumes of the inorganic and organic material is in the range 0.26 to 4; c) atomizing, by aerosol, said solution obtained in step b) to result in the formation of spherical droplets; d) drying said droplets; and e) eliminating said template and said surfactant to obtain an amorphous material with a hierarchical porosity in the microporosity and mesoporosity domain and organized porosity in the mesoporosity domain. This process will hereinafter be referred to as the "process for preparing the material with hierarchical and organized porosity".

In accordance with step a) of the process for preparing the material with hierarchical and organized porosity, the clear solution containing the precursor elements of the proto-zeolitic entities, namely at least one template, at least one silicic precursor and at least one precursor of at least one element X, X advantageously being aluminium, is advantageously carried out using operating protocols which are known to the skilled person.

The silicic precursor used to carry out step a) of the process for preparing the material with a hierarchical and organized porosity is advantageously selected from oxide of silicon precursors which are well known to the skilled person. In particular, a silicic precursor is advantageously used which is selected from silica precursors which are in routine use in the synthesis of zeolites or related solids, for example using solid powdered silica, silicic acid, colloidal silica, dissolved silica or tetraethoxysilane also known as tetraethylorthosilicate (TEOS). Preferably, the silicic precursor is TEOS.

The precursor of element X used to carry out step a) of the process for preparing the material with hierarchical and organized porosity may be any compound comprising the element X which can liberate said element in solution, especially in aqueous or aqua-organic solution, in the reactive form. In the case in which X is aluminium, the alumina precursor is an inorganic aluminium salt with formula $AlZ_3$, Z being a halogen, a nitrate or a hydroxide. Preferably, Z is chlorine. The alumina precursor may also be an aluminium sulphate with formula $Al_2(SO_4)_3$. The alumina precursor may also be an organometallic precursor with formula $Al(OR)_3$ in which R=ethyl, isopropyl, n-butyl, s-butyl ($Al^sOC_4H_9)_3$) or t-butyl or a chelated precursor such as aluminium acetylacetonate ($Al(C_5H_8O_2)_3$). Preferably, R is s-butyl. The alumina precursor may also advantageously be sodium aluminate or ammonium aluminate or alumina proper in one of its crystalline phases known to the skilled person (alpha, delta, theta, gamma), preferably in the hydrated form or a form which may be hydrated.

It is also possible to use mixtures of the precursors cited above. Some or all of the alumina and silica precursors may optionally be added in the form of a single compound comprising both aluminium atoms and silicon atoms, for example an amorphous silica-alumina.

The template used to carry out step a) of the process for preparing the material with a hierarchical and organized porosity may be ionic or neutral, depending on the nature of the zeolite or related solid which would be obtained from said proto-zeolitic entities. It is routine to use templates from the following non-exhaustive list: organic nitrogen-containing cations such as tetapropylammonium (TPA), elements from the alkali family (Cs, K, Na, etc), crown ethers, diamines as well as any other template which is well known to the skilled person for the synthesis of zeolite or a related solid.

In general, the clear solution containing the precursor elements of proto-zeolitic entities in accordance with step a) of the process for preparing the material with a hierarchical and organized porosity is obtained by preparing a reaction mixture comprising at least one silicic precursor, at least one precursor of at least one element X, X advantageously being aluminium, and at least one template. The reaction mixture is either aqueous or aqua-organic, for example a water-alcohol mixture. It is preferable to operate in a basic reaction medium during the various steps of the process for preparing the material with a hierarchical and organized porosity in order to encourage the development of proto-zeolitic entities constituting the amorphous and microporous walls of the matrix of each of the particles of material present in the catalyst of the invention. The basic nature of the solution is advantageously ensured by the basicity of the template employed or by rendering the reaction mixture basic by adding a basic compound, for example an alkali metal hydroxide, preferably sodium hydroxide. The reaction mixture may advantageously be placed under hydrothermal conditions under an autogenous pressure, optionally by adding a gas, for example nitrogen, at a temperature in the range from ambient temperature to 200° C., preferably in the range from ambient temperature to 170° C. and more preferably at a temperature which does not exceed 120° C. until a clear solution is formed containing the precursor elements of the proto-zeolitic entities constituting the amorphous and microporous walls of the matrix of each of the spherical particles of the material present in the catalyst of the invention. In accordance with a preferred operating mode, the reaction mixture comprises at least one template, at least one silicic precursor and at least one precursor of at least one element X, X advantageously being aluminium, is matured at ambient temperature in order to obtain a clear solution containing the precursor elements of the proto-zeolitic entities which can generate the formation of crystalline zeolitic entities.

In accordance with step a) of the process for preparing the material with a hierarchical and organized porosity, the precursor elements of the proto-zeolitic entities present in the clear solution are synthesized using operating protocols which are known to the skilled person. In particular, for a material of the invention the matrix of each spherical particle of which is constituted by beta proto zeolite entities, a clear solution containing the precursor elements of the beta proto-zeolitic entities is produced in accordance with the operating protocol described by P Prokesova, S Mintova, J Cejka, T Bein et al, Micropor Mesopor Mater, 2003, 64, 165. For a material of the invention the matrix of each spherical particle of which is constituted by proto-zeolitic entities of the FAU type, a clear solution containing the precursor elements of proto-zeolitic entities of type FAU is produced in accordance with the operating protocols described by Y Liu, W Z Zhang, T J Pinnavaia et al, J Am Chem Soc, 2000, 12, 8791 and K R Kloetstra, H W Zandbergen, J C Jansen, H van Bekkum, Microporous Mater, 1996, 6, 287. For a material of the invention the matrix of each spherical particle of which is constituted by proto-zeolitic ZSM-5 entities, a clear solution containing precursor elements of proto-zeolitic ZSM-5 entities is produced using the operating protocol described by A E Persson, B J Schoeman, J Sterte, J E Otterstedt, Zeolites, 1995, 15, 611.

In accordance with step b) of the process for preparing the material with a hierarchical and organized porosity, the surfactant used is advantageously an ionic or non-ionic surfactant or a mixture of the two, preferably the surfactant used is a non-ionic surfactant. Preferably, the ionic surfactant is selected from anionic surfactants such as sulphates, such as sodium dodecyl sulfate (SDS), for example. Preferably, the non-ionic surfactant may be any copolymer having at least two portions with different polarities endowing them with amphiphilic macromolecular properties. Said copolymers may comprise at least one block appearing in the following non-exhaustive list of polymer classes: fluorinated polymers (—[$CH_2$—$CH_2$—$CH_2$—$CH_2$—O—CO—R1]- in which R1=$C_4F_9$, $C_8F_{17}$, etc), biological polymers such as polyamino acids (polylysine, alginates, etc), dendrimers, polymers constituted by chains of poly(alkylene oxide). Any other copolymer with an amphiphilic nature which is known to the skilled person may be used if it can produce a stable solution in step b) of the process for preparing the material with a hierarchical and organized porosity, such as poly(styrene-b-acrylamide) (S Forster, M Antionnetti, Adv Mater, 1998, 10, 195; S Förster, T Plantenberg, Angew Chem Int Ed, 2002, 41, 688, H Cölfen, Macromol Rapid Commun, 2001, 22, 219). Preferably, in the context of the present invention, a block copolymer constituted by poly(alkylene oxide) chains is used. Said block copolymer is preferably a block copolymer having two, three of four blocks, each block being constituted by one poly(alkylene oxide) chain. For a two-block copolymer, one of the blocks is constituted by a poly(alkylene oxide) chain which is hydrophilic in nature and the other block is constituted by a poly(alkylene oxide) chain which is hydrophobic in nature. For a three-block copolymer, at least one of the blocks is constituted by a poly(alkylene oxide) chain which is hydrophilic in nature while at least one of the other blocks is constituted by a poly(alkylene oxide) chain which is hydrophobic in nature. Preferably, in the case of a three-block copolymer, the chains of poly(alkylene oxide) with a hydrophilic nature are chains of poly(ethylene oxide), $(PEO)_x$ and $(PEO)_z$, and the poly(alkylene oxide) chains which are hydrophobic in nature are chains of poly(propylene oxide), $(PPO)_y$, chains of poly(butylene oxide) or mixed chains, each chain of which is a mixture of several alkylene oxide monomers. Most preferably, in the case of a three-block copolymer, this is constituted by two chains of poly(ethylene oxide) and one chain of poly(propylene oxide). More precisely, a compound with formula $(PEO)_x(PPO)_y(PEO)_z$ is used in which x is in the range 5 to 300, y is in the range 33 to 300 and z is in the range 5 to 300. Preferably, the values of x and z are identical. Highly advantageously, a compound in which x=20, y=70 and z=20 (P123) is used and a compound in which x=106, y=70 and z=106 (F127) is used. Commercially available non-ionic surfactants known as Pluronic (BASF), Tetronic (BASF), Triton (Sigma), Tergitol (Union Carbide), Brij (Aldrich) can be used as non-ionic surfactants in step b) of the process for preparing the material with a hierarchical and organized porosity. For a four-block copolymer, two of the blocks are constituted by a poly(alkylene oxide) chain which is hydrophilic in nature and the other two blocks are constituted by a poly(alkylene oxide) chain which is hydrophobic in nature.

The solution obtained at the end of step b) of the process for preparing the material with a hierarchical and organized porosity in which at least said surfactant and at least said clear solution obtained in step a) are mixed may advantageously be acid, neutral or basic. Preferably, said solution is basic and preferably has a pH of more than 9, this pH value generally being imposed by the pH of the clear solution containing the precursor elements of the proto-zeolitic entities obtained in accordance with step a) of the process for preparing the material with a hierarchical and organized porosity. The solution obtained at the end of step b) may be aqueous or it may be a water-organic solvent mixture, the organic solvent preferably being a polar solvent, especially an alcohol, preferably ethanol.

The quantity of organic compounds, i.e. surfactant and template, present in the mixture of step b) of the process for preparing the material with a hierarchical and organized porosity is defined with respect to the quantity of inorganic material present in said mixture after adding the clear solution containing the precursor elements of the proto-zeolitic entities obtained during step a) of the process for preparing the material with a hierarchical and organized porosity. The quantity of inorganic material corresponds to the quantity of material of the silicic precursor and to that of the precursor of element X. The volume ratio $V_{inorganic}/V_{organic}$ in the mixture obtained after carrying out step b) is such that the binary organic-inorganic system formed during the atomization of step c) of the process for preparing the material with a hierarchical and organized porosity undergoes a process of meso-structuring by auto-assembly of the template jointly with hydrolysis/condensation reactions of the various inorganic precursors. Said volume ratio $V_{inorganic}/V_{organic}$ is defined as follows:

$$V_{inorganic}/V_{organic}=(m_{inorg}*\rho_{org})/(m_{org}*\rho_{inorg})$$

where $m_{inorg}$ is the final mass of the inorganic fraction in the condensed oxide form in the solid elementary particle obtained by atomization, $m_{org}$ is the total mass of the non-volatile organic fraction in the solid elementary particle obtained by atomization, $\rho_{org}$ and $\rho_{inorg}$ are the respective densities associated with the non-volatile organic and inorganic fractions. In the context of the invention, when the element X is aluminium and in order to simplify the calculations (the approximations are valid for the vast majority of non-volatile organic fractions and for an inorganic fraction of the "aluminosilicate framework" type), it is assumed that $\rho_{org}=1$ and $\rho_{inorg}=2$. In the context of the invention, $m_{inorg}$ generally corresponds to the mass of $SiO_2$ supplemented by that of the mass of $AlO_2$, when X is aluminium, and $m_{org}$ corresponds to the mass of template, for example TPAOH, supplemented by the mass of surfactant, for example the surfactant F127. The polar solvent, preferably ethanol, as well as water and sodium hydroxide, are not taken into account in the calculation of said ratio $V_{inorganic}/V_{organic}$. The species comprising an element X, advantageously alumina species, for the preparation of the material present in the catalyst of the invention, introduced after carrying out said step b) are not taken into account in the calculation of the volume ratio $V_{organic}/V_{organic}$ defined above. In accordance with the invention, the quantity of organic material and the quantity of inorganic material in the mixture obtained after carrying out step b) is such that the ratio $V_{inorganic}/V_{organic}$ is in the range 0.26 to 4, preferably in the range 0.30 to 2. In accordance with step b) of the process for preparing the material with a hierarchical and organized porosity, the initial concentration of surfactant introduced into the mixture, defined as $c_0$, is such that $c_0$ is less than or equal to $c_{mc}$, the parameter $c_{mc}$ representing the critical micellar concentration which is well known to the skilled person, i.e. the limiting concentration beyond which self-arrangement of the molecules of surfactant occurs in the solution obtained at the end of step b). Before atomization, the concentration of the surfactant molecules in the solution obtained at the end of step b) of the process for preparing the material with a hierarchical and organized porosity thus does not result in the formation of particular micellar phases. In accordance with a preferred implementation of the process of the invention, the concentration $c_0$ is less than $C_{mc}$, the ratio $V_{inorganic}/V_{organic}$ is such that the composition of the binary system satisfies the composition conditions for which a mesostructuring mechanism occurs by cooperative auto-assembly of the reagents ($V_{inorganic}/V_{organic}$ in the range 0.26 to 4, preferably in the range 0.3 to 2) and said solution envisaged in step b) of the process for preparing the material with a hierarchical and organized porosity is a basic water-alcohol mixture.

The step for atomizing a mixture in step c) of the process for preparing the material with a hierarchical and organized porosity produces spherical droplets. The size distribution of said droplets is of the log-normal type. The aerosol generator used here is a commercial model 9306A type apparatus supplied by TSI with a 6-jet atomizer. The solution is atomized in a chamber into which a vector gas, an $O_2/N_2$ mixture (dry air) is sent, at a pressure P of 1.5 bars.

In step d) of the process for preparing the material with a hierarchical and organized porosity, said droplets are dried. Said drying is carried out by transporting said droplets via the vector gas, the $O_2/N_2$ mixture, in PVC tubes, which results in progressive evaporation of the solution, for example of the basic aquo-organic solution obtained during step b) of the process for preparing the material with a hierarchical and organized porosity, and hence to the production of elementary spherical particles. This drying is advantageously completed by passing said particles into a furnace the temperature of which can be adjusted, the normal temperature range being 50° C. to 600° C. and preferably 80° C. to 400° C., the residence time for said particles in the furnace being of the order of a second. The particles are then advantageously harvested on a filter. A pump placed at the end of the circuit encourages channelling of the species into the experimental aerosol device. Drying the droplets in step d) of the process for preparing the material with a hierarchical and organized porosity is advantageously followed by passage through an oven at a temperature in the range 50° C. to 150° C.

In the particular case in which the element X used to carry out step a) of the process for preparing the material with a hierarchical and organized porosity is the element aluminium and in which the element sodium is present in the clear solution obtained in accordance with step a) of the process for preparing the material with a hierarchical and organized porosity due to the use of sodium hydroxide and/or a sodium-containing template guaranteeing the basicity of said clear solution, it is preferable to carry out a supplemental step for ion exchange which can exchange the Na+ cation for the cation $NH_4+$ between steps d) and e) of the process for preparing the material with a hierarchical and organized porosity. This exchange, which results in the formation of H+ protons after step e) of the process for preparing the material with a hierarchical and organized porosity in the preferred case in which elimination of the template and the surfactant is carried out by calcining in air, is carried out using operating protocols which are well known to the skilled person. One of the usual methods consists of suspending the dried solid particles from step d) of the process for preparing the material with a hierarchical and organized porosity in an aqueous solution of ammonium nitrate. It is then heated under reflux for a period of 1 to 6 hours. The particles are then recovered by filtration (centrifuging at 9000 rpm), washed then dried by passage through an oven at a temperature in the range 50° C. to 150° C. This ion exchange/washing/drying cycle may be repeated several times and preferably two more times. This exchange cycle may also be carried out after steps d) and e) of the process for preparing the material with a hierarchical and organized porosity. Under these conditions, step e) is repeated after the last exchange cycle in order to generate protons H+ as explained above.

In accordance with step e) of the process for preparing the material with a hierarchical and organized porosity, elimination of the template and surfactant in order to obtain the material present in the catalyst of the invention with a hierarchical porosity in the microporosity and mesoporosity domains and organized porosity in the mesoporosity domain is advantageously carried out using chemical extraction processes or by heat treatment, preferably by calcining in air in a temperature range of 300° C. to 1000° C. and more precisely in the range 400° C. to 600° C. for a period of 1 to 24 hours and preferably for a period of 2 to 12 hours.

In the case in which the solution envisaged in step b) of the process for preparing the material with a hierarchical and organized porosity is a water-organic solvent mixture, preferably basic, it is essential that during said step b) of the process for preparing the material with a hierarchical and organized porosity, the concentration of said surfactant at the origin of the mesostructuring of the matrix is lower than the critical micellar concentration and that the ratio $V_{inorganic}/V_{organic}$ is in the range 0.26 to 4, preferably in the range 0.3 to 2, such that evaporation of said aquo-organic solution, preferably basic, during step c) of the process for preparing the material with a hierarchical and organized porosity by the aerosol technique induces a phenomenon of micelle formation or auto-assembly resulting in mesostructuring of the matrix of the material present in the catalyst of the invention. When $c_0<c_{mc}$, mesostructuring of the matrix of the material present in the catalyst of the invention is consecutive upon progressive concentration in each droplet of the precursor elements of the proto-zeolitic entities of the clear solution obtained in step a) of the process for preparing the material with a hierarchical and organized porosity and at least one surfactant introduced during step b) of the process for preparing the material with a hierarchical and organized porosity until the concentration of surfactant is $c > c_{mc}$, resulting from evaporation of the aquo-organic solution, preferably basic.

In accordance with a first preferred implementation of the process for preparing the material with a hierarchical and organized porosity, at least one precursor of at least one element X, X advantageously being aluminium, is introduced to carry out said step b) of the process for preparing the material with a hierarchical and organized porosity. Thus, mixing a solution of at least one surfactant and at least said clear solution obtained in step a) of the process of the invention is carried out in the presence of at least one precursor of said element X, advantageously from alumina precursors, described above in the present description, to carry out said step a) of the process for preparing the material with a hierarchical and organized porosity. In accordance with said first preferred implementation of the process for preparing the material with a hierarchical and organized porosity, the clear solution of step a) of the process for preparing the material with a hierarchical and organized porosity is prepared either in the presence or in the absence of at least one precursor of at least one element X.

In accordance with a second preferred implementation of the preparation process of the invention, at least one precursor of at least one element X, X advantageously being aluminium, is introduced during implementation of said step d) and/or of said step e) of the process for preparing the material with a hierarchical and organized porosity, with a view to producing a modification in the surface of the material present in the catalyst of the invention. In accordance with said second preferred implementation of the process for preparing the material with a hierarchical and organized porosity, said precursor of at least one element X, X advantageously being the alumina precursor, is introduced during implementation of said step d) and/or said step e) using any technique for modifying the surface which is well known to the skilled person, such as grafting at least one precursor of at least one element X, dry impregnation of at least one precursor of at least one element X and excess impregnation of at least one precursor of at least one element X. Said precursor of at least one element X, advantageously an alumina precursor, introduced during implementation of said step d) and/or said step e) of the process for preparing the material with a hierarchical and organized porosity using a surface modification technique, is selected from precursors of said element X, advantageously from alumina precursors, described above in the present description, to carry out said step a) of the process for preparing the material with a hierarchical and organized porosity. In accordance with said second preferred implementation of the process for preparing the material with a hierarchical and organized porosity, step a) of the process for preparing the material with a hierarchical and organized porosity is carried out in the presence or in the absence of at least one precursor of at least one element X, advantageously an alumina precursor, and step b) of the process for preparing the material with a hierarchical and organized porosity is carried out in the presence or absence of at least one precursor of at least one element X, advantageously an alumina precursor.

In accordance with the process for preparing the material with a hierarchical and organized porosity, said first preferred implementation of the process for preparing the material with a hierarchical and organized porosity and said second preferred implementation of the process for preparing the material with a hierarchical and organized porosity are only optional variations of the process for preparing the material with a hierarchical and organized porosity. In addition, when the mesostructured matrix of each of the spherical particles of the material present in the catalyst of the invention comprises an element X, advantageously aluminium, then said element X, advantageously aluminium, is introduced either during step a) of the process for preparing the material with a hierarchical and organized porosity for the preparation of said clear solution, or during the course of step b) in accordance with said first preferred implementation of the process for preparing the material with a hierarchical and organized porosity, or during said step d) and/or said step e) in accordance with said second preferred implementation of the process for preparing the material with a hierarchical and organized porosity. The element X, advantageously aluminium, may also be introduced a number of times when carrying out a number of steps using all possible combinations of the implementations described above. In particular, it is advantageous to introduce the aluminium during said step a) and said step b) or during said step a) and said step d) and/or said step e).

In the case in which the element X is advantageously aluminium, the amorphous aluminosilicate obtained using the process for preparing the material with a hierarchical and organized porosity then has a Si/Al molar ratio, defined from the quantity of elemental silicon introduced during step a) of the process for preparing the material with a hierarchical and organized porosity and the total quantity of elemental aluminium introduced in the step or steps of the process for preparing the material with a hierarchical and organized porosity, which is in accordance with the various preferred implementations described above. Under these conditions and preferably, the range for the molar ratio Si/Al of the material of the invention is in the range 0.5 to 1000.

When said first preferred implementation of the process for preparing the material with a hierarchical and organized porosity is applied, the quantities of organic and inorganic material to be introduced to carry out step b) are adjusted as a function of the quantity of supplemental material of element X, advantageously aluminium, introduced during step b) in said first implementation such that the total quantity of organic and inorganic material introduced for the preparation of the material present in the catalyst of the invention allows micelle formation, resulting in mesostructuring of the matrix of each particle of said material.

The material present in the catalyst of the invention with a hierarchical porosity in the domains of microporosity and mesoporosity and organized porosity in the domain of mesoporosity may be obtained in the form of a powder, beads, pellets, granules or extrudates, the forming operations being carried out using conventional techniques which are known to the skilled person. Preferably, the material present in the catalyst of the invention with a hierarchical porosity in the domains of microporosity and mesoporosity and organized porosity in the mesoporosity domain is obtained in the form of a powder, which is constituted by elementary spherical particles with a maximum diameter of 200 µm, which facilitates the diffusion of reagents during use of the material as a constituent element of the catalyst of the invention in hydrocracking, hydroconversion and hydrotreatment processes.

It should be noted that steps e) of the process for preparing said material with a hierarchical and organized porosity may be carried out before or after any step for forming as described above of said material with a hierarchical and organized porosity and comprising silicon, as well as any step for preparing the catalyst of the invention described below.

The catalyst of the invention is prepared using a process comprising mixing said material with a hierarchical and organized porosity with at least one active phase containing at least one hydrodehydrogenating element from group VIB and/or VIII.

The material with a hierarchical and organized porosity present in the catalyst of the invention is calcined during preparation of said catalyst, advantageously prior to mixing with said active phase. The calcining treatment is normally carried out in air at a temperature of at least 150° C., preferably at least 300° C., more preferably between approximately 350° C. and 1000° C. and more preferably in the range 350° C. to 800° C. In the remainder of the text, said material with a hierarchical and organized porosity which may be formed and may optionally have undergone a heat treatment will be termed the "support" of the catalyst of the invention.

The elements from groups VIB and/or elements from group VIII and optionally those selected from phosphorus, boron, silicon and optional elements from groups VB and VIIB may optionally be introduced, all or in part, before, during or after forming said material with a hierarchical and organized porosity using any method which is known to the skilled person. Said elements may be introduced after forming said material with a hierarchical and organized porosity and after or before drying and calcining said formed material.

In a preferred mode of carrying out the process for preparing the catalyst of the invention, the active phase containing at least one hydrodehydrogenating element from group VIB and/or VIII, optional elements selected from phosphorus, boron, silicon and optional elements from groups VB and VIIB may be introduced during forming of said material with a hierarchical and organized porosity.

In another preferred mode of carrying out the process for preparing the catalyst of the invention, the active phase containing at least one hydrodehydrogenating element from group VIB and/or VIII, optional elements selected from phosphorus, boron, silicon and optional elements from groups VB and VIIB may be introduced by one or more operations for impregnating the support using a solution containing precursors of these elements.

The metal(s) is/are preferably introduced by impregnation of the support.

Preferably, the support is impregnated using an aqueous solution. The support is preferably impregnated using the "dry" impregnation method which is well known to the skilled person. Impregnation may be carried out in a single step using a solution containing all of the constituent elements of the final catalyst.

In the case in which the catalyst of the present invention contains a metal from group VIII and a metal from group VIB, the group VIII metals are preferably introduced using one or more operations for impregnating the formed and calcined support after those from group VIB or at the same time thereof.

In accordance with another preferred mode of carrying out the process for preparing the catalyst of the present invention, the boron and silicon may also be deposited simultaneously using, for example, a solution containing a boron salt and a silicone type silicon compound.

Impregnation of niobium may be facilitated by adding oxalic acid and possibly ammonium oxalate to the solutions of niobium oxalate. Other compounds may be used to improve the solubility and facilitate impregnation of niobium, as is well known to the skilled person.

In the particular case of obtaining the final catalyst of the invention in the form of extrudates, it is advantageous to prepare catalysts with concentrations of elements from groups VIB and/or elements from group VIII, and optionally phosphorus, boron, silicon and possibly elements from groups VB and VIIB which are homogeneous throughout them. It is also advantageous to prepare catalysts with concentrations of elements from groups VIB and/or elements from group VIII, and optionally phosphorus, boron, silicon and optionally elements from groups VB and VIIB which differ at the core and at the periphery. These catalysts have distribution profiles which are termed "dished" or "domed". Another type of distribution is the crust type where the elements of the active phase are distributed at the surface.

In general, the core/edge ratio of the concentrations of elements from groups VIB and/or elements from group VIII, and optionally phosphorus, boron, silicon and optional elements from groups VB, and VIIB is in the range 0.1 to 3. In one variation of the invention, it is in the range 0.8 to 1.2. In another variation of the invention, it is in the range 0.3 to 0.8.

The metals from group VIB and group VIII of the catalyst of the present invention may be present either completely or partially in the form of the metal and/or oxide and/or sulphide.

Sources of molybdenum and tungsten include oxides and hydroxides, molybdic acids and tungstic acids and salts thereof, in particular ammonium salts such as ammonium molybdate, ammonium heptamolybdate, ammonium tungstate, ammonium metatungstate, phosphomolybdic acid ($H_3PMo_{12}O_{40}$), phosphotungstic acid ($H_3PW_{12}O_{40}$) and salts thereof, silicomolybdic acid ($H_4SiMo_{12}O_{40}$), silicotungstic acid ($H_4SiW_{12}O_{40}$) and salts thereof. The sources of molybdenum and tungsten may be any heteropolycompound of the Keggin, lacunary Keggin, Dawson, Anderson, Strandberg etc type, for example. Preferably, oxides and ammonium salts are used, such as ammonium heptamolybdate or ammonium tungstate.

The sources of elements from group VIII which may be used are well known to the skilled person. As an example, for non-noble metals, nitrates such as cobalt nitrate, nickel nitrate, sulphates, hydroxides such as cobalt hydroxides, nickel hydroxides, phosphates, halides (for example chlorides, bromides or fluorides), carboxylates (for example acetates and carbonates) are used. For noble metals, halides, for example chlorides, nitrates such as palladium nitrate, acids such as chloroplatinic acid, and oxychlorides such as ammoniacal ruthenium oxychloride are used.

The preferred source of phosphorus with the phosphorus being used as a doping element is orthophosphoric acid, $H_3PO_4$, but its salts and esters such as ammonium phosphates are also suitable. The phosphorus may, for example, be introduced in the form of a mixture of phosphoric acid and a basic organic compound containing nitrogen such as ammonia, primary and secondary amines, cyclic amines, compounds from the pyridine family and quinolines and compounds from the pyrrole family. Tungsto-phosphoric or phospho-molybdic acids may be employed.

The amount of phosphorus, the phosphorus being used as a doping element, is adjusted, without in any way limiting the scope of the invention, so as to form a mixed compound in solution and/or on the support, for example tungsten-phosphorus or molybdenum-tungsten-phosphorus. These mixed compounds may be heteropolyanions. These compounds may be Keggin heteropolyanions, for example.

The source of boron, namely the boron used as a doping element, may be boric acid, preferably orthoboric acid, $H_3BO_3$, ammonium biborate or pentaborate, boron oxide, or boric esters. The boron may, for example, be introduced in the form of a mixture of boric acid, hydrogen peroxide and a basic organic compound containing nitrogen such as ammonia, primary or secondary amines, cyclic amines, compounds from the pyridine family and quinolines and compounds from the pyrrole family. The boron may, for example, be introduced using a boric acid solution in a water/alcohol mixture.

Many sources of silicon, the silicon being used as a doping agent, may be used. Thus, it is possible to use the tetraethylorthosilicate $Si(OEt)_4$, siloxanes, polysiloxanes, silicones, silicone emulsions, halogen silicates such as ammonium fluorosilicate $(NH_4)_2SiF_6$ or sodium fluorosilicate $Na_2SiF_6$. Silicomolybdic acid and its salts, or silicotungstic acid and its salts may also advantageously be used. The silicon may, for example, be added by impregnating ethyl silicate in solution in a water/alcohol mixture. The silicon may, for example, be added by impregnation of a silicone or silicic acid type silicon compound suspended in water.

The source of elements from group VB which may be used are well known to the skilled person. As an example, the niobium sources which may be used include oxides such as diniobium pentoxide $Nb_2O_5$, niobic acid $Nb_2O_5$, $H_2O$, niobium hydroxides and polyoxoniobates, niobium alkoxides with formula $Nb(OR_1)_5$ where $R_1$ is an alkyl radical, niobium oxalate $Nb(HC_2O_4)_5$, or ammonium niobate. Preferably, niobium oxalate or ammonium niobate is used.

Sources of elements from group VIIA which may be used are well known to the skilled person. As an example, the fluoride anions may be introduced in the form of hydrofluoric acid or salts thereof. Said salts are formed with alkali metals, ammonium or an organic compound. In this latter case, the salt is advantageously formed in the reaction mixture by reaction between the organic compound and hydrofluoric acid. It is also possible to use hydrolysable compounds which can liberate fluoride anions into the water, such as ammonium fluorosilicate $(NH_4)_2SiF_6$, silicon tetrafluoride $SiF_4$ or sodium hexafluoride $Na_2SiF_6$. The fluorine may, for example, be introduced by impregnation of an aqueous solution of hydrofluoric acid or ammonium fluoride.

Impregnation of the material with a hierarchical and organized porosity with the active phase and any metals from group VB, VIIB and those selected from Si, B, P is followed by drying, at reduced pressure or otherwise, at a temperature in the range 50° C. to 300° C. and calcining at a temperature in the range 300° C. to 1000° C. and more precisely between 450° C. and 550° C. for a period of 1 to 24 hours and preferably for a period of 2 to 6 hours.

The catalysts of the invention may be manufactured and used in the form of a powder, a sieved crushed compacted powder, pellets, granules, tablets, rings, beads, wheels, spheres or extrudates, preferably in the form of a sieved crushed compacted powder, spheres or extrudates. However, it is advantageous that the catalyst be in the form of extrudates with a diameter in the range 0.5 to 5 mm and more particularly in the range 0.7 to 2.5 mm. The forms are cylindrical (which may or may not be hollow), twisted cylinders, multi-lobed (2, 3, 4 or 5 lobes, for example), or rings. The cylindrical form is preferably used, but any other form may be used.

Processes for Treating Hydrocarbon Feeds in Accordance With the Invention

The invention also pertains to processes for the treatment of hydrocarbon cuts using the catalyst of the invention.

More particularly, the invention pertains to a process for hydrocracking and/or hydroconversion as well as to a process for hydrotreatment of hydrocarbon feeds using the catalyst of the invention.

The hydrocracking and/or hydroconversion process and the hydrotreatment process of the invention are operated in the presence of hydrogen, at a temperature of more than 200° C., at a pressure of more than 1 MPa, the space velocity being in the range 0.1 to 20 $h^{-1}$ and the quantity of hydrogen introduced being such that the volume ratio of liters of hydrogen/liters of hydrocarbon is in the range 80 to 5000 l/l.

The catalysts of the invention are advantageously used for hydrocracking and/or hydroconversion of hydrocarbon cuts.

The catalysts of the invention may be used for the hydrotreatment of hydrocarbon feeds; said hydrotreatment process may be placed alone or upstream of a hydrocracking and/or hydroconversion process on a hydrocracking catalyst based on zeolite or alumina-silica, preferably comprising nickel and tungsten.

Sulphurization of Catalysts.

Prior to injecting the feed, the catalysts used in the process of the present invention preferably initially undergo a sulphurization treatment to transform at least a portion of the metallic species into the sulphide before they are brought into contact with the feed to be treated. This treatment for activation by sulphurization is well known to the skilled person and may be carried out using any method which is already described in the literature, either in situ, i.e. in the reactor, or ex situ.

The conventional sulphurization method which is well known to the skilled person consists of heating the catalyst in the presence of hydrogen sulphide (pure or, for example, in a stream of a mixture of hydrogen/hydrogen sulphide) at a temperature in the range 150° C. to 800° C., preferably in the range 250° C. to 600° C., generally in a traversed bed reaction zone.

Reduction of Catalysts Based on Noble Metals

Prior to injecting the feed, the hydrocracking catalyst based on noble metals may initially undergo a reduction treatment to transform at least a portion of the oxides of noble metals into reduced noble metals. One preferred method for reducing the catalyst is a treatment in hydrogen at a temperature in the range 150° C. to 650° C. and at a total pressure in the range 0.1 to 20 MPa. It should also be noted that any ex situ reduction method may be suitable. As an example, a reduction may include holding at a temperature of 150° C. for 2 hours, followed by raising the temperature to 350° C. at 1° C. per minute, then maintaining at 350° C. for 2 hours. During this reduction treatment, the hydrogen flow rate may be 1000 liters of hydrogen per liter of catalyst.

Feeds

Highly varied feeds may be treated using the processes of the invention described above. In general, they contain at least 20% by volume and usually at least 80% by volume of compounds boiling above 340° C.

The feed may, for example, be LCOs (light cycle oil) (light gas oils from a catalytic cracking unit), atmospheric distillates, vacuum distillates, for example gas oils from straight run distillation of crude or conversion units such as FCC, coker or visbreaking, as well as feeds deriving from units for extracting aromatics from lubricating base oils or from units for solvent dewaxing from lubricating base oils, or distillates deriving from processes for desulphurization or hydroconversion in a fixed or ebullated bed of ARs (atmosphere residues) and/or VRs (vacuum residues) and/or deasphalted residues, or the feed may be a deasphalted oil or any mixture of the feeds cited above. The above list is not limiting. Paraffins from the Fischer-Tropsch process are excluded. In general, the feeds have a T5 boiling point of more than 340° C., and preferably more than 370° C., i.e. 95% of the compounds present in the feed have a boiling point of more than 340° C., preferably more than 370° C.

The nitrogen content of the feeds treated in the processes of the invention is usually more than 500 ppm by weight, preferably in the range 500 to 10000 ppm by weight, more preferably in the range 700 to 4000 ppm by weight and still more preferably in the range 1000 to 4000 ppm by weight. The sulphur content of the feeds treated in the processes of the invention is usually in the range 0.01% to 5% by weight, preferably in the range 0.2% to 4% by weight and still more preferably in the range 0.5% to 3% by weight.

The feed may optionally contain metals. The cumulative nickel and vanadium content of the feeds treated using the processes of the invention is preferably less than 1 ppm by weight.

The asphaltenes content is generally less than 3000 ppm by weight, preferably less than 1000 ppm by weight, and more preferably less than 200 ppm by weight.

Guard Beds

In the case in which the feed contains resin and/or asphaltene type compounds, it is advantageous to first pass the feed over a bed of catalyst or adsorbent which is different from the hydrocracking and/or hydroconversion or hydrotreatment catalyst. The catalysts or guard beds used in accordance with the invention are in the form of spheres or extrudates. However, it is advantageous for the catalyst to be in the form of extrudates with a diameter in the range 0.5 to 5 mm, more particularly in the range 0.7 to 2.5 mm. The forms are cylinders (which may or may not be hollow), twisted cylinders, multilobed (2, 3, 4 or 5 lobes, for example), or rings. The cylindrical form is preferred, but any other form may be used.

To accommodate the presence of contaminants and/or poisons in the feed, in a further preferred implementation the guard catalysts may have more particular geometrical forms to increase their void fraction. The void fraction of said catalysts is in the range 0.2 to 0.75. Their external diameter may be between 1 and 35 mm. Possible particular non-limiting fowls are: hollow cylinders, hollow rings, Raschig rings, toothed hollow cylinders, crenellated hollow cylinders, pentaring cartwheels, multiple holed cylinders, etc.

These catalysts or guard beds used in accordance with the invention may or may not have been impregnated with an active phase. Preferably, the catalysts are impregnated with a hydrodehydrogenating phase. Highly preferably, the CoMo or NiMo phase is used.

These catalysts or guard beds of the invention may exhibit macroporosity. The guard beds may be those sold by Norton-Saint-Gobain, for example MacroTrap® guard beds. The guard beds may be those sold by Axens from the ACT family: ACT077, ACT935, ACT961 or HMC841, HMC845, HMC941 or HMC945. It may be particularly advantageous to superimpose these catalysts in at least two different beds of varying heights. The catalysts with the highest void ratio are preferably used in the first catalytic bed or beds at the inlet to the catalytic reactor. It may also be advantageous to use at least two different reactors for said catalysts.

Preferred guard beds of the invention are HMCs and ACT961.

Operating Conditions

The operating conditions such as temperature, pressure, hydrogen recycle rate, hourly space velocity, may vary widely as a function of the nature of the feed, the desired quality of the products and the facilities available to the refiner. The hydrocracking/hydroconversion or hydrotreatment catalyst is generally brought into contact with the feeds described above in the presence of hydrogen, at a temperature of more than 200° C., often in the range 250° C. to 480° C., advantageously in the range 320° C. to 450° C., preferably in the range 330° C. to 435° C., at a pressure of more than 1 MPa, usually in the range 2 to 25 MPa, preferably in the range 3 to 20 MPa, the space velocity being in the range 0.1 to 20 $h^{-1}$ and preferably 0.1-6 $h^{-1}$, preferably 0.2-3 $h^{-1}$, and the quantity of hydrogen introduced being such that the volume ratio of liters of hydrogen/liters of hydrocarbon is in the range 80 to 5000 l/l and usually in the range 100 to 2000 l/l.

These operating conditions used in the processes of the invention can generally reach conversions per pass into products with boiling points of less than 340° C., preferably less than 370° C., of more than 15% and more preferably in the range 20% to 95%.

Implementations

The hydrocracking and/or hydroconversion processes employing the catalysts of the invention cover the fields of pressure and conversion from mild hydrocracking to high pressure hydrocracking. The term "mild hydrocracking" means hydrocracking resulting in moderate conversions, generally less than 40%, and operating at low pressure, generally in the range 2 MPa to 6 MPa.

The catalyst of the present invention may be used alone, in a single or in several catalytic beds in fixed bed mode, in one or more reactors, in a hydrocracking operation termed a once-through process, with or without liquid recycling of the non-converted fraction, optionally in combination with a hydrorefining catalyst located upstream of the catalyst of the present invention.

The catalyst of the present invention may be used alone, in one or several ebullated bed reactors, in a hydrocracking operation termed a once-through process, with or without liquid recycling of the unconverted fraction, optionally in combination with a hydrorefining catalyst located in a fixed bed reactor or in an ebullated bed reactor upstream of the catalyst of the present invention.

The ebullated bed functions with withdrawal of the used catalyst and daily addition of fresh catalyst in order to keep the activity of the catalyst stable.

Once-Through Process

Hydrocracking termed a once-through process comprises in the first instance and in general manner an intense hydrorefining which is intended to carry out hydrodenitrogenation and intense desulphurization of the feed before it is sent to the hydrocracking catalyst proper, in particular in the case in which it includes a zeolite. This intense hydrorefining of the feed results in only limited conversion of the feed into lighter fractions, which is not enough and thus has to be completed on a more active hydrocracking catalyst. However, it should be noted that no separation is involved between the two types of catalyst. All of the effluent from the reactor outlet is injected onto the hydrocracking catalyst proper and it is only then that separation of the products formed is carried out. This version of hydrocracking, termed once-through, has a variation which involves recycling the unconverted fraction to the reactor with a view to more intense conversion of the feed.

Fixed Bed Once-Through Process

For catalysts with a low silica content, the quantities by weight of silica of the support forming part of the composition of the catalyst are in the range 5% to 30% and preferably in the range 5% to 20%.

For catalysts with a high silica content, the quantities by weight of silica of the support forming part of the composition of the catalyst are in the range 20% to 80%, preferably in the range 30% to 60%.

When the catalyst of the present invention is used upstream of a zeolitic hydrocracking catalyst, for example based on Y zeolite, advantageously a catalyst is used which has a low silica mass content as defined above. It could also advantageously be used in combination with a hydrorefining catalyst, this latter being located upstream of the catalyst of the present invention.

When the catalyst of the present invention is used upstream of a hydrocracking catalyst based on alumina-silica or based on zeolite, in the same reactor in distinct catalytic beds or in distinct reactors, the conversion is generally (or preferably) less than 50% by weight and preferably less than 40%.

The catalyst of the invention may be used upstream or downstream of the zeolitic catalyst. Downstream of the zeolitic catalyst, it can crack PAHs. The term PAH means polyaromatic hydrocarbons such as those described in the work "Hydrocracking, Science and Technology" by J Scherzer, published by M Dekker Inc, 1996.

Ebullated Bed Once-Through Process

The catalyst of the invention may be used alone or in one or more reactor(s). In the context of such a process, it may be advantageous to use several reactors in series, the ebullated bed reactor or reactors containing the catalyst of the invention being preceded by one or more reactor(s) containing at least one fixed bed or ebullated bed hydrorefining catalyst.

When the catalyst of the present invention is used downstream of a hydrorefining catalyst, conversion of the fraction of the feed occasioned by said hydrorefining catalyst is generally (or preferably) less than 30% by weight and preferably less than 25%.

Fixed Bed Once-Through Process With Intermediate Separation

The catalyst of the present invention may also be used in a once-through hydrocracking process comprising a hydrorefining zone, a zone allowing partial elimination of ammonium, for example by hot flash, and a zone comprising a hydrocracking catalyst. This once-through process for hydrocracking hydrocarbon feeds for the production of middle distillates and possibly base oils comprises at least one first hydrorefining reaction zone, and at least one second reaction zone, in which hydrocracking of at least a portion of the effluent from the first reaction zone is carried out. This process also comprises incomplete separation of ammonia from the effluent leaving the first zone. This separation is advantageously carried out using an intermediate hot flash. The hydrocracking carried out in the second reaction zone is carried out in the presence of ammonia in a quantity smaller than the quantity present in the feed, preferably less than 1500 ppm by weight, more preferably less than 1000 ppm by weight and still more preferably less than 800 ppm by weight of nitrogen. The catalyst of the present invention is preferably used in the hydrocracking reaction zone in combination or not in combination with a hydrorefining catalyst located upstream of the catalyst of the present invention.

The catalyst of the invention may also be used in the first reaction zone for converting pre-treatment, alone or in combination with a conventional hydrorefining catalyst, located upstream of the catalyst of the invention, in one or more catalytic beds in one or more reactor(s).

Once-Through Hydrocracking Process With Preliminary Hydrorefining on a Low Acidity Catalyst The catalyst of the invention may be used in a hydrocracking process comprising:
 a first hydrorefining reaction zone in which the feed is brought into contact with at least one hydrorefining catalyst having, in the standard activity test defined in French patent FR-2 840 621, a degree of cyclohexane conversion of less than 10% by weight;
 a second hydrocracking reaction zone in which at least a portion of the effluent from the hydrorefining step is brought into contact with at least one hydrocracking catalyst having, in the standard activity test, a degree of cyclohexane conversion of more than 10% by weight, the catalyst of the invention being present in at least one of the two reaction zones.

The proportion of the catalytic volume occupied by the hydrorefining catalyst generally represents 20% to 45% of the total catalytic volume.

The effluent from the first reaction zone is at least in part, preferably completely, introduced into the second reaction zone of said process. Intermediate separation of the gas may be carried out, as described above.

The effluent from the outlet from the second reaction zone undergoes "final" separation (for example by atmospheric distillation followed by vacuum distillation) to separate the gas. At least one residual liquid fraction is obtained, essentially containing products the boiling point of which is generally more than 340° C., which may be recycled at least in part upstream of the second reaction zone of the process of the invention, and preferably upstream of the hydrocracking catalyst based on alumina-silica, with the aim of producing middle distillates.

The conversion of products with boiling points of less than 340° C. or less than 370° C. is at least 50% by weight.

Two-Step Process

In a hydrocracking operation termed a two-step process with intermediate separation between the two reaction zones, in a given step the catalyst of the present invention may be used in one or in both reactors in combination or not in combination with a hydrorefining catalyst located upstream of the catalyst of the present invention.

Two-step hydrocracking comprises a first step which, like the once-through process, is intended to carry out hydrorefining of the feed, but also to reach a conversion of the latter of the order of 40% to 60% in general. The effluent from the first step then undergoes separation (distillation) which is usually termed intermediate separation, which is intended to separate the conversion products from the unconverted fraction. In the second step of a two-step hydrocracking process, only the fraction of the feed not converted during the first step is treated. This separation means that a two-step hydrocracking process may be more selective for middle distillates (kerosene+diesel) than a once-through process. In fact, intermediate separation of the conversion products prevents them from being over-cracked to naphtha and gas in the second step on the hydrocracking catalyst. Further, it should be noted that the unconverted fraction of the feed treated in the second step generally contains very small amounts of $NH_3$ as well as organic nitrogen-containing compounds, in general less than 20 ppm by weight or even less than 10 ppm by weight.

The configurations of fixed bed or ebullated bed catalytic beds described in the case of a once-through process may be used in the first step of a two-step process whether the catalyst of the invention is used alone or in combination with a conventional hydrorefining catalyst.

For once-through processes and for the first step of two-step hydrocracking processes, the preferred catalysts of the invention are catalysts doped with non-noble group VIII elements, more preferably catalysts based on nickel and tungsten, and the preferred doping element is phosphorus.

The catalysts used in the second step of the two-step hydrocracking processes are preferably doped catalysts based on noble group VIII elements, more preferably catalysts based on platinum and/or palladium, and the preferred doping element is phosphorus.

Hydrotreatment/Hydrorefining of Hydrocarbon Feeds in Accordance With the Invention The catalysts of the invention are used for hydrotreatment and hydrorefining of hydrocarbon feeds such as oil cuts, cuts derived from coal or hydrocarbons produced from natural gas, more particularly for hydrogenation, hydrodesulphurization, hydrodenitrogenation, hydrodeoxygenation, hydrodearomatization and hydrodemetallization of hydrocarbon feeds containing aromatic and/or olefinic and/or naphthenic and/or paraffinic compounds, said feeds optionally containing metals and/or nitrogen and/or oxygen and/or sulphur.

More particularly, the feeds used in the hydrotreatment processes are gasolines, gas oils, vacuum gas oils, atmospheric residues, vacuum residues, atmospheric distillates, vacuum distillates, heavy fuels, oils, waxes and paraffins, spent oils, deasphalted residues or crudes, feeds deriving from thermal or catalytic conversion processes and mixtures thereof. They generally contain heteroatoms such as sulphur, oxygen or nitrogen and/or at least one metal.

As recalled above, the catalysts of the invention may be used in a large number of hydrorefining or hydrotreatment applications. The operating conditions which may be applied in these processes are usually: a temperature of 200° C. to 450° C., preferably 250° C. to 440° C., a pressure of 1 to 25 MPa, preferably 1 to 18 MPa, an hourly space velocity of 0.1 to 20 $h^{-1}$, preferably 0.2 to 5 $h^{-1}$, a hydrogen/feed ratio, expressed as the volume of hydrogen measured under normal temperature and pressure conditions per volume of liquid feed, which is generally 80 l/l to 5000 l/l and usually 100 l/l to 2000 l/l.

The following examples illustrate the present invention without in any way limiting its scope.

EXAMPLES

In the examples below, the aerosol technique used is that described above in the disclosure of the invention.

For each of the examples below of supports S1 and S3, the ratio $V_{inorganic}/V_{organic}$ of the mixture from step b) was calculated. This ratio is defined as follows:
$V_{inorganic}/V_{organic} = (m_{inorg}*\rho_{org})/(m_{org}*\rho_{inorg})$, where $m_{inorg}$ the final mass of the inorganic fraction in the condensed oxide farm, namely $SiO_2$ and $AlO_2$, in the solid elementary particle obtained by atomization, $m_{org}$ is the total mass of the organic non-volatile fraction in the solid elementary particle obtained by atomization, namely the surfactant and the template, $\rho_{org}$ and $\rho_{inorg}$ are respectively the densities associated with the non-volatile organic and inorganic fractions. In the examples below, it is assumed that $\rho_{org}=1$ and $\rho_{inorg}=2$. Further, the ratio $V_{inorganic}/V_{organic}$ is calculated as being equal to
$V_{inorganic}/V_{organic} = (m_{SiO2}+m_{AlO2})/[2*(m_{template}+m_{surfactant})]$. Ethanol, sodium hydroxide, water are not taken into account in the calculation of said ratio $V_{inorganic}/V_{organic}$.

Example 1

Preparation of a Catalyst C1 (Invention)

Forming of Support S1

Preparation of a material S1 with a hierarchical porosity in the domains of microporosity and mesoporosity and organized porosity in the domain of mesoporosity the microporous amorphous walls of which are constituted by ZSM-5 type (MFI) aluminosilicate proto-zeolitic entities such that the molar ratio Si/Al=49.

6.86 g of a solution of tetrapropyl ammonium hydroxide solution (TPAOH, 40% by weight in an aqueous solution) was added to 0.37 g of aluminium sec-butoxide ($Al(O^8C_4H_9)_3$). After stirring vigorously at ambient temperature for 30 min, 27 g of demineralized water and 18.75 g of tetraethylorthosilicate (TEOS) were added. It was stirred vigorously at ambient temperature for 18 hours to obtain a clear solution. Next, a solution containing 66.61 g of ethanol, 61.24 g of water and 5.73 g of surfactant F127 (pH of mixture=13.5) was added to this solution. The ratio $V_{inorganic}/V_{organic}$ of the mixture was 0.32. It was all stirred for 10 minutes. It was sent to the atomization chamber of an aerosol generator as described in the description above and the solution was sprayed in the form of fine droplets under the action of a vector gas (dry air) introduced under pressure (P=1.5 bars). The droplets were dried using the protocol described in the above disclosure of the invention: they were channelled using a $O_2/N_2$ mixture, in PVC tubes. They were then introduced into a furnace adjusted to a drying temperature fixed at 350° C. The harvested powder was then oven dried for 18 hours at 95° C. The powder was then calcined in air for 5 h at 550° C. The solid was characterized by low angle XRD, by nitrogen volumetry, by TEM, by MEB, and by XF. TEM analysis showed that the final material had an organized mesoporosity characterized by a vermicular structure. Nitrogen volumetric analysis combined with analysis using the $\alpha_s$ method produced a value for the microporous volume $V_{micro}$ ($N_2$) of 0.13 ml/g, a value for the mesoporous volume $V_{meso}$ ($N_2$) of 0.61 ml/g and a specific surface area of the final material of S=781 $m^2/g$. The mesoporous diameter $\phi$, characteristic of the mesostructured matrix, was 7 nm. Small angle XRD analysis showed up a correlation peak at angle $2\theta=0.78°$. The Bragg relation, $2d*\sin(\theta)=1.5406$, enabled the correlation distance d between the organized mesopores of the material to be calculated: d=11.3 nm. The thickness of the walls of the mesostructured material, defined by $e=d-\phi$, was thus e=4.3 nm. The Si/Al molar ratio, obtained by XF, was 59. A MEB image of the elementary spherical particles obtained indicated that these particles have a dimension characterized by a diameter of 50 to 3000 nm, the size distribution of these particles being centred about 300 nm. The material thus synthesised was used in the form of a sieved crushed compacted powder.

Support S1 was thus produced.

Preparation of Hydrocracking Catalyst C1 of the Invention

Catalyst C1 was obtained by dry impregnation of the support S1 in the form of a sieved crushed compacted powder using an aqueous solution comprising tungsten and nickel salts. The tungsten salt was ammonium metatungstate $(NH_4)_6 H_2W_{12}O_{40}*4H_2O$ and that of nickel was nickel nitrate, $Ni(NO_3)_2*6H_2O$. Following maturation at ambient temperature in a water-saturated atmosphere, the sieved crushed compacted powder was dried at 120° C. overnight then calcined at 500° C. in dry air. The contents by weight of $WO_3$, NiO of catalyst C1 were respectively 29.5% and 3.9%.

The characteristics of catalyst C1 were as follows:

The BET surface area was 360 $m^2/g$.

The mean mesoporous diameter, measured by mercury porosimetry, was 6.7 nm.

Example 2

Preparation of a Catalyst C2 (Invention)

Forming Support S2

Preparation of material S2 with a hierarchical porosity in the domains of microporosity and mesoporosity and organized porosity in the domain of mesoporosity the microporous and amorphous walls of which are constituted by ZSM-5 (MFI) type aluminosilicate proto-zeolitic entities such that the molar ratio Si/Al=12.

6.86 g of a solution of tetrapropyl ammonium hydroxide solution (TPAOH, 40% by weight in an aqueous solution) was added to 1.71 g of aluminium sec-butoxide ($Al(O^8C_4H_9)_3$). After stirring vigorously at ambient temperature for 30 min, 27 g of demineralized water and 17.66 g of tetraethylorthosilicate (TEOS) were added. It was stirred vigorously at ambient temperature for 4 days to obtain a clear solution. Next, a solution containing 66.61 g of ethanol, 61.24 g of water and 5.73 g of surfactant F127 (pH of mixture=12) was added to this solution. The ratio $V_{inorganic}/V_{organic}$ of the mixture was 0.32 and was calculated as described above. It was all stirred for 10 minutes. It was sent to the atomization chamber of an aerosol generator as described in the description above and the solution was sprayed in the form of fine droplets under the action of a vector gas (dry air) introduced under pressure (P=1.5 bars). The droplets were dried using the protocol described in the above disclosure of the invention: they were channelled using a $O_2/N_2$ mixture, in PVC tubes. They were then introduced into a furnace adjusted to a drying temperature fixed at 350° C. The harvested powder was then oven dried for 18 hours at 95° C. The powder was then calcined in air for 5 h at 550° C. The solid was characterized by low angle XRD, by nitrogen volumetry, by TEM, by MEB, and by XF. TEM analysis showed that the final material had an organized mesoporosity characterized by a vermicular structure. Nitrogen volumetric analysis combined with analysis using the $\alpha_s$ method produced a value for the microporous volume $V_{micro}$ ($N_2$) of 0.03 ml/g, a value for the mesoporous volume $V_{meso}$ ($N_2$) of 0.45 ml/g and a specific surface area of the final material of S=595 m²/g. The mesoporous diameter $\phi$, characteristic of the mesostructured matrix, was 5 nm. Small angle XRD analysis showed up a correlation peak at angle 2θ=0.98°. The Bragg relation, 2d*sin(θ)=1.5406, enabled the correlation distance d between the organized mesopores of the material to be calculated: d=9 nm. The thickness of the walls of the mesostructured material, defined by e=d−$\phi$, was thus e=4 nm. The Si/Al molar ratio, obtained by XF, was 12. A MEB image of the elementary spherical particles obtained indicated that these particles have a dimension characterized by a diameter of 50 to 3000 nm, the size distribution of these particles being centred about 300 nm. The synthesised material was used in the form of a sieved crushed compacted powder.

Support S2 was thus produced.

Preparation of Hydrocracking Catalyst C2 of the Invention

Catalyst C2 was obtained by dry impregnation of the support S2 in the form of a sieved crushed compacted powder using an aqueous solution comprising tungsten and nickel salts. The tungsten salt was ammonium metatungstate $(NH_4)_6H_2W_{12}O_{40}*4H_2O$ and that of nickel was nickel nitrate $Ni(NO_3)_2*6H_2O$. Following maturation at ambient temperature in a water-saturated atmosphere, the sieved crushed compacted powder was dried at 120° C. overnight then calcined at 500° C. in dry air. The contents by weight of $WO_3$, NiO of catalyst C2 were respectively 29.8% and 3.7%.

The characteristics of catalyst C2 were as follows:

The BET surface area was 284 m²/g.

The mean mesoporous diameter, measured by mercury porosimetry, was 4.8 nm.

Example 3

Preparation of a Catalyst C3 (Invention)

Catalyst C3 was obtained by dry impregnation of the support S2 in the form of a sieved crushed compacted powder using an aqueous solution comprising tungsten and nickel salts as well as phosphoric acid $H_3PO_4$. The tungsten salt was ammonium metatungstate $(NH_4)_6H_2W_{12}O_{40}*4H_2O$ and that of nickel was nickel nitrate $Ni(NO_3)_2*6H_2O$. Following maturation at ambient temperature in a water-saturated atmosphere, the sieved crushed compacted powder was dried at 120° C. overnight then calcined at 500° C. in dry air. The contents by weight of $WO_3$, NiO, $P_2O_5$ of catalyst C3 were respectively 29.9%, 3.8% and 2%.

The characteristics of catalyst C3 were as follows:

The BET surface area was 271 m²/g.

The mean mesoporous diameter, measured by mercury porosimetry, was 4.7 nm.

Example 4

Preparation of Catalyst C4 (Invention)

Forming Support S3

Preparation of a material S3 with a hierarchical porosity in the domains of microporosity and mesoporosity and organized porosity in the domain of mesoporosity the microporous amorphous walls of which are constituted by beta type (BEA) aluminosilicate proto-zeolitic entities such that the molar ratio Si/Al=49.

4.96 g of a solution of tetraethyl ammonium hydroxide solution (TEAOH, 40% by weight in an aqueous solution) was added to 0.37 g of aluminium sec-butoxide (Al($O^8C_4H_9$)$_3$). After stirring vigorously at ambient temperature for 30 min, 27 g of demineralized water and 18.75 g of tetraethylorthosilicate (TEOS) were added. It was stirred vigorously at ambient temperature for 18 hours to obtain a clear solution. Next, a solution containing 66.61 g of ethanol, 61.24 g of water and 5.73 g of surfactant F127 (pH of mixture=13.5) was added to this solution. The ratio $V_{inorganic}/V_{organic}$ of the mixture was 0.35 and was calculated as described above. It was all stirred for 10 minutes. It was sent to the atomization chamber of an aerosol generator as described in the description above and the solution was sprayed in the form of fine droplets under the action of a vector gas (dry air) introduced under pressure (P=1.5 bars). The droplets were dried using the protocol described in the above disclosure of the invention: they were channelled using a $O_2/N_2$ mixture, in PVC tubes. They were then introduced into a furnace adjusted to a drying temperature fixed at 350° C. The harvested powder was then oven dried for 18 hours at 95° C. The powder was then calcined in air for 5 h at 550° C. The solid was characterized by low angle XRD, by nitrogen volumetry, by TEM, by MEB, and by XF. TEM analysis showed that the final material had an organized mesoporosity characterized by a vermicular structure. Nitrogen volumetric analysis combined with analysis using the $\alpha_s$ method produced a value for the microporous volume $V_{micro}$ (N2) of 0.09 ml/g, a value for the mesoporous volume $V_{meso}$ ($N_2$) of 0.52 ml/g and a specific surface area of the final material of S=634 m²/g. The mesoporous diameter $\phi$, characteristic of the mesostructured matrix, was 4 nm. Small angle XRD analysis showed up a correlation peak at angle 2θ=1.09°. The Bragg relation, 2d*sin(θ)=1.5406, enabled the correlation distance d between the organized mesopores of the material to be calculated: d=8.1 nm. The thickness of the walls of the mesostructured material, defined by e=d−$\phi$, was thus e=4.1 nm. The Si/Al molar ratio, obtained by XF, was 59. A MEB image of the elementary spherical particles obtained indicated that these particles have a dimension characterized by a diameter of 50 to 3000 nm, the size distribution of these particles being centred about 300 nm. The material thus synthesised was used in the form of a sieved crushed compacted powder.

Support S3 was thus produced.

Preparation of Hydrocracking Catalyst C4 of the Invention

Catalyst C4 was obtained by dry impregnation of the support S3 in the form of a sieved crushed compacted powder using an aqueous solution comprising tungsten and nickel salts. The tungsten salt was ammonium metatungstate $(NH_4)_6W_{12}O_{40}*4H_2O$ and that of nickel was nickel nitrate $Ni(NO_3)_2*6H_2O$. Following maturation at ambient temperature in a water-saturated atmosphere, the sieved crushed compacted powder was dried at 120° C. overnight then calcined at 500° C. in dry air. The contents by weight of $WO_3$, NiO of catalyst C4 were respectively 29.7% and 3.7%.

The characteristics of catalyst C4 were as follows:
The BET surface area was 295 m²/g.
The mean mesoporous diameter, measured by mercury porosimetry, was 3.8 nm.

Example 5

Evaluation of Catalysts C1, C2, C3, C4 in Once-Through High Pressure Hydrocracking of a Vacuum Distillate Positioned in the 2$^{nd}$ Reactor, the Hydrocracking Reactor Catalysts C1, C2, C3, C4 the preparations of which were described in Examples 1, 2, 3, 4 were used to hydrocrack a vacuum distillate which had been hydrotreated, with the principal characteristics shown in Table 1, which had been supplemented with 1250 ppm of N and 2.8% of S.

TABLE 1

| Characteristics of non-supplemented hydrotreated vacuum distillate | |
|---|---|
| Density at 15° C. | 0.8670 |
| Sulphur (% by weight) | 0 |
| Nitrogen (ppm by weight) | 0 |
| Simulated distillation | |
| 5% point | 211° C. |
| 50% point | 411° C. |
| 95% point | 513° C. |

Catalysts C1, C2, C3, C4 were used in accordance with the process of the invention using a pilot unit comprising one fixed traversed bed reactor, the fluids flowing in upflow mode.

Prior to the hydrocracking test, the catalysts were sulphurized at 14 MPa at 350° C. using a straight run gas oil supplemented with 2% by weight of DMDS (dimethyldisulphide).

After sulphurization, the catalytic tests were carried out under the following conditions:
Total pressure: 14 MPa;
Hydrogen flow rate: 1000 liters of gaseous hydrogen per liter of injected feed;
The space velocity (HSV) was 1 h$^{-1}$;
Temperature: temperature required to attain 80% net conversion.

In order to simulate the partial pressure of $NH_3$ and $H_2S$ liberated in the hydrorefining reactor, the feed was constituted by hydrotreated VD supplemented with 1250 ppm of N and 2.8% of S.

The catalytic performances were expressed as the temperature required to attain 80% net conversion into products with a boiling point of less than 370° C., and by the gross selectivity for middle distillate (150-370° C. cut). The conversion and selectivity were expressed from the simulated distillation results.

The net conversion of products with a boiling point of less than 370° C., denoted NC 370° C., is equal to:

$$NC\ 370°\ C.=[(\%\ of\ 370°\ C._{effluents}^-)-(\%\ of\ 370°\ C._{feed}^-)]/[100-(\%\ of\ 370°\ C._{feed}^-)]$$

where

% of 370° C.$_{effluents}^-$=mass of compounds with boiling points below 370° C. in effluents;

and

% of 370° C.$_{feed}^-$=mass of compounds having boiling points less than 370° C. in feed.

The gross selectivity for middle distillate cut 150-370° C., denoted GS MD, is equal to:

$$GS\ MD=[(\text{fraction of }150\text{-}370_{effluents})]/[(\%\ of\ 370°\ C._{effluents}^-)].$$

The catalytic performances obtained are given in Table 2 below.

TABLE 2

| Catalytic results for high pressure once-through hydrocracking | | | |
|---|---|---|---|
| Catalyst | HSV (h$^{-1}$) | Temperature necessary to obtain 80% of NC 370° C., % by weight | GS MD, % by weight |
| C1 | 1 | 392° C. | 76.5 |
| C2 | 1 | 382° C. | 72.2 |
| C3 | 1 | 383° C. | 71.9 |
| C4 | 1 | 395° C. | 77.8 |

The above examples thus show the advantage of using a catalyst of the invention to carry out hydrocracking of hydrocarbon feeds. The catalysts of the invention can produce high conversions of the feed and advantageous middle distillate selectivities due to the greater proximity of the acid and hydrogenating sites, preventing over-cracking of the reagents.

Example 6

Evaluation of Catalysts C1, C2, C3, C4 in High Pressure Once-Through Vacuum Hydrocracking The catalysts of the invention were placed in the hydrocracking reactor in concatenation with a hydrotreatment catalyst Catalysts C1, C2, C3, C4 the preparations of which were described in Examples 1, 2, 3, 4 were used to hydrocrack a vacuum distillate at high pressure (14 MPa). Catalysts C1, C2, C3, C4 were used in combination with a hydrorefining catalyst, the latter being located upstream of the catalyst of the invention. The catalysts of the invention trigger end of bed conversion in the hydrotreatment reactor.

The principal characteristics of the oil feed are shown in Table 3.

TABLE 3

| Characteristics of vacuum distillates | |
|---|---|
| Density at 15° C. | 0.926 |
| Sulphur (% by weight) | 2.03 |
| Nitrogen (ppm by weight) | 1527 |
| Simulated distillation | |
| 5% point | 375° C. |
| 10% point | 393° C. |
| 50% point | 458° C. |
| 90% point | 535° C. |
| End point | 587° C. |

The catalytic test unit comprised two fixed bed reactors in upflow mode. 40 ml of catalyst was introduced into each reactor. In the first reactor, that into which the feed passed first, the catalyst for the first hydrotreatment step, HRK558 sold by Axens, was introduced, comprising an element from group VI and an element from group VIII deposited on alumina. In the second reactor, that into which the feed passed last, the catalyst of the invention was introduced (C1, C2, C3, C4). The two catalysts underwent an in situ sulphurization step before reaction. The catalysts were sulphurized at 14 MPa, at 350° C. using a straight run gas oil supplemented with 2% by weight of DMDS.

Once sulphurization had been carried out, the feed described above could be transformed.

The catalytic tests were carried out under the following conditions:

Total pressure: 14 MPa;
Hydrogen flow rate: 1000 liters of gaseous hydrogen per liter of injected feed;
The space velocity (HSV) was $0.7\ h^{-1}$;
Temperature: temperature required to attain 60% net conversion at the outlet from the second reactor. The net conversion of products with a boiling point of less than 370° C., denoted NC 370° C., is equal to:

$$NC\ 370°\ C. = [(\%\ of\ 370°\ C._{effluents\ R2}^-) - (\%\ of\ 370°\ C._{effluents\ R1}^-)] / [100 - (\%\ of\ 370°\ C._{effluents\ R1}^-)]$$

where

% of 370° C.$_{effluents\ Rx}^-$=mass content of compounds with boiling points below 370° C. in effluents for the corresponding reactor x;

The gross selectivity for middle distillate 150-370° C. cut, denoted GS MD, is equal to:

$$GS\ MD = [(fraction\ of\ 150\text{-}370_{effluents\ R2})] / [(\%\ of\ 370°\ C._{effluents\ R2}^-)].$$

The catalytic performances were expressed as the temperature required to attain 60% net conversion of products with a boiling point of less than 370° C., by the gross selectivity for middle distillates 150-370° C. cut. The conversion and selectivity were expressed from the simulated distillation results.

Table 4 below shows the reaction temperature necessary to obtain 60% net conversion and the gross selectivity for the catalysts of the invention.

TABLE 4

Catalytic results for high pressure once-through hydrocracking in association with a hydrorefining catalyst

| Catalyst | HSV ($h^{-1}$) | Temperature necessary to obtain 60% of NC 370° C., % by weight | GS MD, % by weight |
|---|---|---|---|
| C1 | 0.7 | 386° C. | 81.0 |
| C2 | 0.7 | 377° C. | 78.8 |
| C3 | 0.7 | 375° C. | 78.4 |
| C4 | 0.7 | 388° C. | 81.4 |

The above examples thus show the advantage of using a catalyst of the invention to carry out hydrocracking of hydrocarbon feeds. The catalysts of the invention can produce high conversions of the feed and advantageous middle distillate selectivities due to the greater proximity of the acid and hydrogenating sites, preventing over-cracking of the reagents.

Example 7

Evaluation of catalysts C1, C2, C3, C4 in Moderate Pressure Once-Through Vacuum Hydrocracking (Mild Hydrocracking) in an Operation in Which the Catalysts Are in Concatenation Catalysts C1, C2, C3, C4 the preparations of which were described in Examples 1, 2, 3, 4 were used under moderate pressure mild hydrocracking vacuum distillation conditions (6 MPa). Catalysts C1, C2, C3, C4 were used in concatenation with a hydrorefining catalyst, this latter being located upstream of the catalyst of the invention. The principal characteristics of the oil feed are shown in Table 5.

TABLE 5

Characteristics of vacuum distillates

| | |
|---|---|
| Density at 15° C. | 0.923 |
| Sulphur (% by weight) | 2.36 |
| Nitrogen (ppm by weight) | 857 |
| Simulated distillation | |
| 5% point | 346° C. |
| 50% point | 450° C. |
| 95% point | 543° C. |
| End point | 568° C. |

The catalytic test unit comprised two fixed bed reactors in upflow mode. 40 ml of catalyst was introduced into each reactor. In the first reactor, that into which the feed passed first, the catalyst for the first hydrotreatment step, HRK558 sold by Axens, was introduced, comprising an element from group VI and an element from group VIII deposited on alumina. In the second reactor, that into which the feed passed last, the catalyst of the invention was introduced (C1, C2, C3, C4). The two catalysts underwent an in situ sulphurization step before reaction. The catalysts were sulphurized at 6 MPa, at 350° C. using a straight run gas oil supplemented with 2% by weight of DMDS. Once sulphurization had been carried out, the feed described above could be transformed.

After sulphurization, the catalytic tests were carried out under the following conditions:

Total pressure: 6 MPa;
Hydrogen flow rate: 450 liters of gaseous hydrogen per liter of injected feed;
The space velocity (HSV) was $1\ h^{-1}$;
Temperature: temperature required to attain 50% net conversion at the outlet from the second reactor. The net conversion of products with a boiling point of less than 370° C., denoted NC 370° C., is equal to:

$$NC\ 370°\ C. = [(\%\ of\ ^{370°}\ C._{effluents\ R2}^-) - (\%\ of\ 370°\ C._{inlet\ feed}^-)] / [100 - (\%\ of\ 370°\ C._{inlet\ feed}^-)]$$

where

% of 370° C.$_{effluents\ R2}^-$=mass content of compounds with boiling points below 370° C. in effluents from second reactor; and % of 370° C.$_{inlet\ feed}^-$=mass content of compounds having boiling points less than 370° C. in feed at inlet to first reactor.

The catalytic performances were expressed as the temperature required to attain 50% net conversion into products with a boiling point of less than 370° C., and by the gross selectivity for middle distillates (150-370° C. cut). The conversion and selectivity were expressed from the simulated distillation results.

The catalytic performances obtained are given in Table 6 below.

TABLE 6

Catalytic results for moderate pressure mild hydrocracking

| Catalyst | HSV (h$^{-1}$) | Temperature necessary to obtain 50% of NC 370° C., % by weight | GS MD, % by weight Middle distillate (MD) |
|---|---|---|---|
| C1 | 1 | 398° C. | 80.0 |
| C2 | 1 | 386° C. | 78.4 |
| C3 | 1 | 387° C. | 78.9 |
| C4 | 1 | 399° C. | 80.3 |

The above example thus shows the advantage of using a catalyst of the invention to carry out hydrocracking of hydrocarbon feeds. The catalyst of the invention can produce high conversions of the feed and highly advantageous middle distillate selectivities due to the greater proximity of the acid and hydrogenating sites, preventing over-cracking of the reagents.

The invention claimed is:

1. A catalyst comprising:
   at least one support formed from at least one amorphous material comprising silicon with a hierarchical and organized porosity, constituted by at least two elementary spherical particles, each of said spherical particles comprising a matrix based on oxide of silicon, which is mesostructured, having a mesopore diameter in the range of 1.5 to 30 nm and having amorphous and microporous walls entirely constituted by proto-zeolitic entities with a thickness in the range of 1.5 to 50 nm, said elementary spherical particles having a maximum diameter of 200 microns;
   at least one active phase containing at least one hydrodehydrogenating element from group VIB and/or group VIII of the periodic table of the elements.

2. A catalyst according to claim 1, in which said hydrodehydrogenating element of said active phase is molybdenum.

3. A catalyst according to claim 1, in which said hydrodehydrogenating element of said active phase is tungsten.

4. A catalyst according to claim 1, in which said hydrodehydrogenating element is at least one of cobalt, nickel and platinum.

5. A catalyst according to claim 1, in which said element from group VIII is nickel and said element from group VIB is tungsten.

6. A catalyst according to claim 1, in which none of the spherical particles constituting said material has macropores.

7. A catalyst according to claim 1, in which said proto-zeolitic entities are species for initiating at least one zeolite selected from the group consisting of aluminosilicates ZSM-5, ZSM-48, ZSM-22, ZSM-23, ZBM-30, EU-1, EU-2, EU-11, beta, zeolite A, Y, USY, VUSY, SDUSY, mordenite, NU-87, NU-88, NU-86, NU-85, IM-5, IM-12, IZM-2, ferrierite and at least one related solid, wherein the related solid is selected from the group consisting of silicoaluminophosphates SAPO-11 and SAPO-34.

8. A process for hydrocracking and/or hydroconversion of hydrocarbon feeds using the catalyst of claim 1 comprising:
   contacting the catalyst of claim 1 with a hydrocarbon feed.

9. A hydrocracking and/or hydroconversion process according to claim 8, carried out in accordance with a once-through process.

10. A hydrocracking and/or hydroconversion process according to claim 8, carried out in accordance with a two-step process.

11. A process for hydrotreatment of hydrocarbon feeds using the catalyst of claim 1 comprising:
    contacting the catalyst of claim 1 with a hydrocarbon feed.

12. A process according to claim 11, placed upstream of a hydrocracking and/or hydroconversion process.

13. A process according to claim 8, operated in the presence of hydrogen, at a temperature of more than 200° C., at a pressure of more than 1 MPa, the hourly space velocity being in the range 0.1 to 20 h$^{-1}$ and the quantity of hydrogen introduced being such that the volume ratio of liters of hydrogen/liters of hydrocarbon is in the range 80 to 5000 l/l.

14. A process according to claim 8, in which the hydrocarbon feeds are selected from the group consisting of LCO (light cycle oil; light gas oils from a catalytic cracking unit), atmospheric distillates, vacuum distillates, feeds from units for aromatic extraction of lubricating base oils or from solvent dewaxing of lubricating base oils, distillates deriving from processes for fixed bed or ebullated bed desulphurization or hydroconversion of AR (atmospheric residues), VR (vacuum residues), deasphalted oils, and deasphalted oils, used alone or as a mixture.

* * * * *

UNITED STATES PATENT AND TRADEMARK OFFICE
CERTIFICATE OF CORRECTION

PATENT NO. : 8,715,485 B2  Page 1 of 1
APPLICATION NO. : 12/993932
DATED : May 6, 2014
INVENTOR(S) : Bonduelle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 470 days.

Signed and Sealed this
Twenty-ninth Day of September, 2015

Michelle K. Lee
*Director of the United States Patent and Trademark Office*